United States Patent
Chang et al.

(10) Patent No.: US 9,318,794 B2
(45) Date of Patent: Apr. 19, 2016

(54) APPARATUS AND METHOD FOR BEAM LOCKING IN WIRELESS COMMUNICATION SYSTEM

(75) Inventors: Young-Bin Chang, Gyeonggi-do (KR); Rakesh Taori, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 255 days.

(21) Appl. No.: 13/465,638

(22) Filed: May 7, 2012

(65) Prior Publication Data

US 2013/0040682 A1 Feb. 14, 2013

(30) Foreign Application Priority Data

Aug. 10, 2011 (KR) ......................... 10-2011-0079567
Aug. 22, 2011 (KR) ......................... 10-2011-0083331

(51) Int. Cl.
| | |
|---|---|
| *H04B 1/00* | (2006.01) |
| *H04B 15/00* | (2006.01) |
| *H04M 1/00* | (2006.01) |
| *H01Q 1/24* | (2006.01) |
| *H01Q 3/00* | (2006.01) |
| *H04B 7/06* | (2006.01) |

(52) U.S. Cl.
CPC ................ *H01Q 1/243* (2013.01); *H01Q 3/00* (2013.01); *H04B 7/0617* (2013.01)

(58) Field of Classification Search
CPC ......... H01Q 3/00; H01Q 3/26; H04B 7/0617; H04B 7/70408; H04B 7/0634; H04B 7/082; H04W 16/28
USPC ........ 455/461, 517, 63.4, 562.1, 67.11, 575.7
See application file for complete search history.

(56) References Cited

U.S. PATENT DOCUMENTS

| | | | |
|---|---|---|---|
| 5,893,033 A * | 4/1999 | Keskitalo et al. ............. 455/437 |
| 6,229,481 B1 * | 5/2001 | Katz ............................. 342/367 |
| 6,792,259 B1 * | 9/2004 | Parise ........................ 455/343.1 |
| 7,062,296 B2 * | 6/2006 | Brennan et al. ............ 455/562.1 |
| 7,395,030 B2 | 7/2008 | Yoshida et al. |
| 7,929,914 B2 * | 4/2011 | Tegreene ..................... 455/63.4 |
| 2002/0072374 A1 * | 6/2002 | Chang et al. .................. 455/452 |
| 2003/0043071 A1 * | 3/2003 | Lilly et al. .................... 342/368 |
| 2005/0020311 A1 * | 1/2005 | Goldberg et al. .......... 455/562.1 |
| 2005/0197071 A1 | 9/2005 | Yoshida et al. |

(Continued)

FOREIGN PATENT DOCUMENTS

| | | |
|---|---|---|
| CN | 1675859 | 9/2005 |
| CN | 101764285 | 6/2010 |

(Continued)

OTHER PUBLICATIONS

European Search Report dated Apr. 8, 2015 issued in counterpart application No. 12822181.9-1852.

(Continued)

*Primary Examiner* — Simon Nguyen
(74) *Attorney, Agent, or Firm* — The Farrell Law Firm, P.C.

(57) ABSTRACT

To retain a beam direction of beamforming in a wireless communication system, an apparatus for the beamforming includes a detector for measuring change of at least one of a movement and a motion of the apparatus; and a processor for determining a beam control parameter for aligning a beam direction with a counterpart apparatus by compensating for the change of the beam direction according to at least one of the movement and the motion.

23 Claims, 15 Drawing Sheets

(56) References Cited

U.S. PATENT DOCUMENTS

| | | | |
|---|---|---|---|
| 2006/0246863 A1* | 11/2006 | Reed | 455/276.1 |
| 2007/0040687 A1 | 2/2007 | Reynolds | |
| 2007/0054617 A1* | 3/2007 | Nikolajevic et al. | 455/41.2 |
| 2008/0258971 A1 | 10/2008 | Nichols et al. | |
| 2009/0232245 A1* | 9/2009 | Lakkis | 375/267 |
| 2010/0246476 A1* | 9/2010 | Hethuin et al. | 370/315 |
| 2010/0311457 A1* | 12/2010 | Johansson et al. | 455/517 |
| 2011/0287796 A1* | 11/2011 | Jain et al. | 455/509 |
| 2012/0169539 A1 | 7/2012 | Huang et al. | |
| 2012/0202548 A1* | 8/2012 | Lee et al. | 455/513 |
| 2012/0208567 A1* | 8/2012 | Mesecher | 455/456.5 |
| 2013/0040655 A1* | 2/2013 | Keidar | 455/456.1 |
| 2013/0336648 A1* | 12/2013 | Britz et al. | 398/26 |
| 2014/0105054 A1* | 4/2014 | Saegrov et al. | 370/252 |

FOREIGN PATENT DOCUMENTS

| | | |
|---|---|---|
| EP | 1 124 391 | 8/2001 |
| EP | 1 587 224 | 10/2005 |
| JP | 2004-064741 | 2/2004 |
| JP | 2007-324752 | 12/2007 |

OTHER PUBLICATIONS

LCS AdHoc (Ericsson Editor), CR 24 to 25.305 from LCS Adhoc Group Drafting, R2-001777, 3GPP RAN WG2 Meeting #15, Aug. 21-25, 2000, 36 pages.

Japanese Office Action dated Nov. 9, 2015 issued in counterpart application No. 2014-524913, 6 pages.

European Search Report dated Sep. 8, 2015 issued in counterpart application No. 12822181.9-1852, 9 pages.

Pre-Examination Processing Notice dated Feb. 8, 2016 issued in counterpart application No. 2012293073, 2 pages.

Chinese Office Action dated Feb. 25, 2016 issued in counterpart application No. 201280038985.6, 16 pages.

* cited by examiner

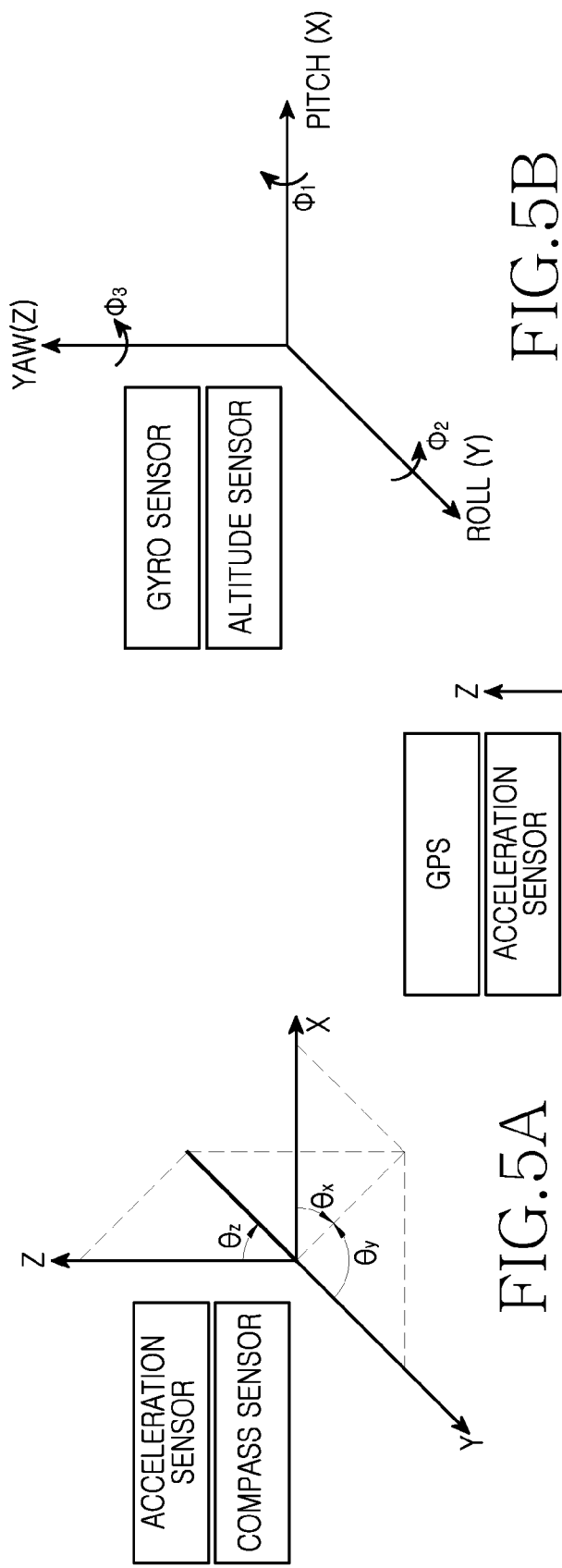

US 9,318,794 B2

APPARATUS AND METHOD FOR BEAM LOCKING IN WIRELESS COMMUNICATION SYSTEM

PRIORITY

The present application claims priority under 35 U.S.C. §119(a) to a Korean patent application filed in the Korean Intellectual Property Office on Aug. 10, 2011, and assigned Serial No. 10-2011-0079567 and a Korean patent application filed in the Korean Intellectual Property Office on Aug. 22, 2011 and assigned Serial No. 10-2011-0083331, the contents of which are incorporated herein by reference.

BACKGROUND

1. Field of the Invention

The present invention relates generally to a wireless communication system, and more particularly, to an apparatus and a method for retaining a beam direction of beamforming in a wireless communication system.

2. Description of the Related Art

A transmitter of a wireless communication system is capable of transmitting an electric signal using an antenna, and a receiver of the same system is capable of receiving the electric signal from the transmitter over a radio channel. The Friis equation is typically used, at the receiver, as a gain model of the receive signal using gains of the transmit and receive antennas.

FIG. 1 is a diagram illustrating a transmitter and a receiver in a wireless communication system. When a transmitter 110 has an antenna gain of $G_t$ and a receiver 120 has an antenna gain $G_r$, the Friis equation is provided as set forth in Equation (1) below.

$$P_r = P_t \frac{G_t G_r \lambda^2}{16\pi^2 d^2} \quad (1)$$

In Equation (1), $P_r$ denotes a power of a receive signal, $P_t$ denotes a power of a transmit signal, $G_t$ denotes the antenna gain of the transmitter, $G_r$ denotes the antenna gain of the receiver, $\lambda$ denotes a wavelength, and d denotes a distance between the transmitter and the receiver.

Equation (1) is applicable in a free space. Accordingly, in an actual system, some modifications can be made according to characteristics of a radio channel. Equation (1) signifies that the power received at the receiver is proportional to the antenna gains of the transmitter and the antenna gains of the receiver.

FIGS. 2A and 2B are diagrams illustrating power radiation patterns of an antenna in a wireless communication system. FIG. 2A illustrates the radiation pattern of the power of an isotropic antenna, and FIG. 2B illustrates the radiation pattern of the power of a directional antenna. Referring to FIG. 2A, the power radiated from the isotropic antenna is circular or spherical. By contrast, the power radiated from the directional antenna of FIG. 2B is in the form of a fan or a cone. When the power value radiated from the antennas of FIGS. 2A and 2B is equal, the directional antenna of FIG. 2B concentrates the power in a particular direction and the resulting signal of FIG. 2B can be propagated farther than the signal transmitted via the isotropic antenna of FIG. 2A. The reception based on the antenna directivity is the antenna gain value in the Friis equation of Equation (1). Specifically, as the beam range of the antenna becomes narrower, the gain of the antenna increases. However, since the power of the beam is concentrated in a particular direction and range, its serviceable area reduces. Specifically, the antenna gain is typically inversely proportional to the service area.

The performance of the wireless communication system can be enhanced in accordance with the radiation pattern of the signal, as described above. The technique of forming the radiation pattern of the intended signal is commonly referred to as beamforming. Beamforming increases the transmit and receive gains by applying directivity to the beam using multiple antennas, thereby raising the signal reception strength of a specific receiver. Specifically, the beamforming technique depends on how the antenna gain and the service direction and range are set.

FIG. 3 is a diagram illustrating beams of a base station adopting the beamforming technique in a wireless communication system. Referring to FIG. 3, the base station covers a plurality of sectors (i.e., 1, 2 and 3), and forms a plurality of directional beams in the respective sectors. When beamforming is applied, the signal range is narrow. Accordingly, in order to service one base station cell or sector, it is necessary to utilize a plurality of beams per antenna in the sector. For example, in FIG. 3, Beams #1-3 are formed in Sector #1. As the base station performs beamforming of the narrow range, a user station can attain better channel state.

The user station selects the best beam from the beams of the base station and selects a new beam according to its motion or movement. The narrower the beam width, the more frequently a new beam is selected. When the user station also adopts beamforming, the best channel status is attained when the beam direction of the base station aligns with the beam direction of the user station. However, unlike the stationary base station, the user station is mobile, and a direction of the device with respect to the base station is easily changeable. As a result, the beam direction of the user station can be frequently misaligned with the beam direction of the base station.

FIGS. 4A to 4D are diagrams illustrating beam directions of a base station and a user station in a wireless communication system, according to an embodiment of the present invention.

Referring first to FIG. 4A, a beam direction for transmission and reception at a base station 410 aligns with a beam direction for transmission and reception at a user station 420. When the beam direction of the base station 410 faces the user station 420, the user station 420 lies within a beam range of the base station 410. In order to improve reliability and efficiency of data transmission and reception, the user station 420 also forms a beam toward the base station 410. When the beam directions of the base station 410 and the user station 420 are aligned as shown in FIG. 4A, optimum communication quality is attained.

Typically, beam training is adopted to straighten the beam direction between the base station and the user station. Beam training is divided into a downlink and an uplink. In the downlink, the base station allocates a particular sequence for beam training to beam training reference signals of a specific direction, and transmits the reference signals as the beam of the specific direction. Hence, the user station informs the base station of a particular code value of the reference signal having the best communication quality amongst one or more beam training reference signals received from the base station. Thus, the aligned beam direction of the base station and the user station can be determined.

In the uplink, the user station allocates a particular code for beam training to beam training reference signals of a specific direction, and transmits the reference signals as the beam of the specific direction. The base station informs the user station of a particular code value of the reference signal having the best communication quality amongst the beam training reference signals.

Beam training is adequate for stationary base stations and user stations. However, when the user station frequently moves in a short period of time, it is difficult to apply the beam alignment method using beam training. FIGS. 4B, 4C and 4D illustrate this shortcoming in detail. Specifically, FIGS. 4B, 4C and 4D illustrate misalignment of the beam directions according to the motion and the movement of the user station 420. Referring to FIG. 4B, as the user station 410 is tilted, the beam directions of the base station 410 and the user station 420 are misaligned in accordance with the amount of tilt. Referring to FIG. 4C, when the user station 420 rotates, the beam directions of the base station 410 and the user station 420 are misaligned in accordance with the amount of rotation. As the user station 420 moves as shown in FIG. 4D, the beam directions of the base station 410 and the user station 420 are misaligned in accordance with the amount of movement.

As shown in FIGS. 4B, 4C and 4D, the beam directions of the base station 410 and the user station 420 can misalign according to the motion or movement of a user. When misaligned, the communication quality of the base station 410 and the user station 420 is greatly deteriorated. Further, since the motion or movement of the user is frequent over a relatively short time, it is hard to overcome this deterioration with the typical beam training method. More specifically, in order to detect any change in the beam direction of the user station 420, the base station 410 needs to conduct the beam training on a very short cycle. Since accurate information about a change in the beam direction of the user station 420 is required, control messages are frequently exchanged, which increases system overhead.

SUMMARY OF THE INVENTION

The present invention has been made to address at least the above problems and/or disadvantages and to provide at least the advantages described below. Accordingly, an aspect of the present invention provides an apparatus and a method for maintaining a beam direction of a user station for beamforming in a wireless communication system.

Another aspect of the present invention provides an apparatus and a method for providing and receiving control messages relating to motion recognition sensors of a user station in a wireless communication system.

Another aspect of the present invention provides an apparatus and a method for correcting a beam direction according to a motion of a user station in a wireless communication system.

A further aspect of the present invention provides an apparatus and a method for hybrid beamforming.

Yet another aspect of the present invention is to provide an apparatus and a method for measuring a motion of a user station in a wireless communication system.

Still another aspect of the present invention is to provide an apparatus and a method for measuring a motion of a user station using a motion recognition sensor in a wireless communication system.

According to one aspect of the present invention, an apparatus for performing beam locking in a wireless communication system is provided. The apparatus includes at least one motion recognition sensor for measuring at least one physical value indicating at least one of a movement and a motion of the apparatus. The apparatus also includes a processor for calculating a difference value indicating a difference between the at least one physical value and a reference value of a reference direction, determining a beam control parameter, using the difference value, for aligning a beam direction of a beam the apparatus with a counterpart apparatus, and adjusting the beam direction according to the beam control parameter.

According to another aspect of the present invention, a method for performing beam locking in a wireless communication system is provided. At least one physical value indicating at least one of a movement and a motion of an apparatus is measured using at least one motion recognition sensor. A difference value indicating a difference between the at least one physical value and a reference value of a reference direction is calculated. A beam control parameter for aligning a beam direction of a beam of the apparatus with a counterpart apparatus is determined using the difference value. The beam direction is adjusted according to the beam control parameter.

According to an additional aspect of the present invention, an operating method of a user station in a wireless communication system is provided. A first control message including information about at least one motion recognition sensor for measuring at least one of movement and motion of the user station is generated. The first control message is transmitted to a base station.

According to a further aspect of the present invention, an operating method of a base station in a wireless communication system is provided. A first control message including information about at least one motion recognition sensor for measuring at least one of movement and motion of the user station is received. The information about the at least one motion recognition sensor for measuring at least one of the movement and the motion of the user station is obtained via the first control message.

According to another aspect of the present invention, an apparatus for a user station in a wireless communication system is provided. The apparatus includes a controller for generating a first control message having information about at least one motion recognition sensor for measuring at least one of movement and motion of the user station. The apparatus also includes a transceiver for transmitting the first control message to a base station.

According to still another aspect of the present invention, an apparatus for a base station in a wireless communication system is provided. The apparatus includes a transceiver for receiving a first control message having information about at least one motion recognition sensor for measuring at least one of movement and motion of the user station. The apparatus also includes a controller for obtaining the information about at least one motion recognition sensor for measuring at least one of the movement and the motion of the user station via the first control message.

Additionally, according to another aspect of the present invention, an article of manufacture for performing beam locking in a wireless communication system is provided, which includes a machine readable medium containing one or more programs which when executed implement the steps of: measuring at least one physical value indicating at least one of a movement and a motion of an apparatus using at least one motion recognition sensor; calculating a difference value indicating a difference between the at least one physical value and a reference value of a reference direction; determining a beam control parameter, using the difference value, for aligning a beam direction of a beam of the apparatus with a counterpart apparatus; and adjusting the beam direction according to the beam control parameter.

According to a further aspect of the present invention an apparatus is provided for hybrid beamforming. The apparatus includes an encoder and a modulator for converting an information bit stream into complex symbols, a plurality of precoders, each on one of a plurality of paths, that each multiply the complex symbols by a respective beamforming parameter, and a plurality of Inverse Fast Fourier Transform (IFFT) operators, each on one of the plurality of paths, for converting the multiplied complex symbols into OFDM symbols, which are digital signals. The apparatus also includes a plurality of digital to analog converters, each on one of the plurality of paths, for converting the digital signals into analog signals, and a plurality of mixers, each on one of the plurality of paths, for converting the analog signals into Radio Frequency (RF) signals. The apparatus further includes a plurality of phase/magnitude converters on each of the plurality of paths for changing the magnitude and phase of the RF signals. Each phase/magnitude converter of a respective path provides an RF signal to a different one of a plurality of antennas. Additionally, the apparatus includes the plurality of antennas for transmitting respective summed RF signals from the plurality of paths.

According to another aspect of the present invention, a method is provided for hybrid beamforming. An information bit stream is converted into complex symbols at an encoder and a modulator. The complex symbols are multiplied by a respective beamforming parameter at a plurality of precoders, each on one of a plurality of paths. The multiplied complex symbols are converted into OFDM symbols, which are digital signals, at a plurality of IFFT operators, each on one of the plurality of paths. The digital signals are converted into analog signals at a plurality of digital to analog converters, each on one of the plurality of paths. The analog signals are converted into RF signals at a plurality of mixers, each on one of the plurality of paths. The magnitude and phase of the RF signals are changed at a plurality of phase/magnitude converters on each of the plurality of paths. Each phase/magnitude converter of a respective path provides an RF signal to a different one of a plurality of antennas. Respective summed RF signals are transmitted from the plurality of paths at the plurality of antennas.

BRIEF DESCRIPTION OF THE DRAWINGS

The above and other aspects, features, and advantages of the present invention will be more apparent from the following description when taken in conjunction with the accompanying drawings, in which:

FIGS. 5A to 5C are diagrams illustrating a process for measuring a motion and a movement of the user station using sensors in the wireless communication system, according to an embodiment of the present invention;

DETAILED DESCRIPTION OF EMBODIMENTS OF THE PRESENT INVENTION

Figure 1:
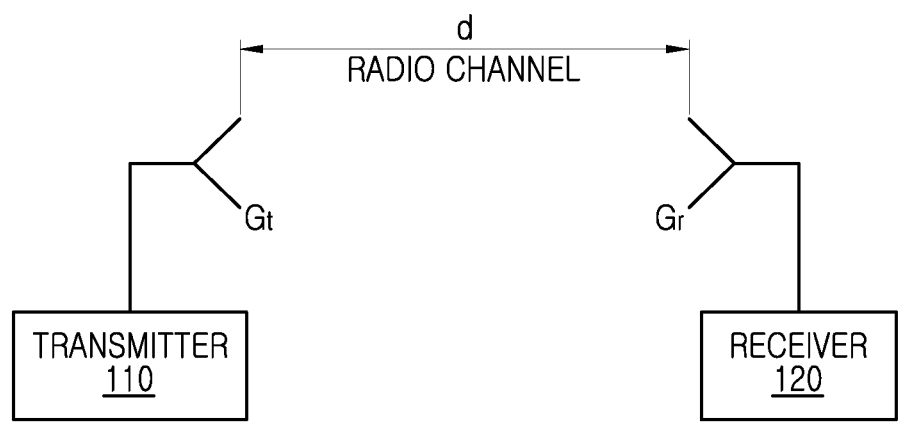
FIG. 1 is a diagram illustrating a transmitter and a receiver in a wireless communication system.
Figure 2A:
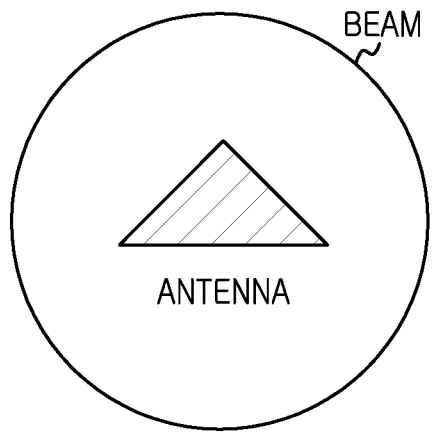
FIG. 2 is a diagram illustrating power radiation patterns of an antenna in the wireless communication system.
Figure 2B:
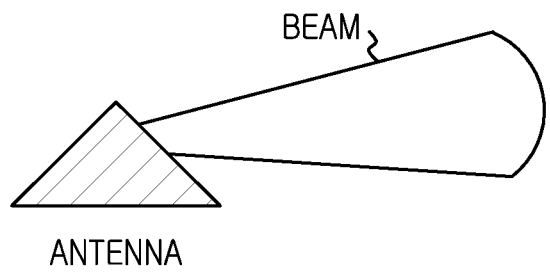
Figure 3:
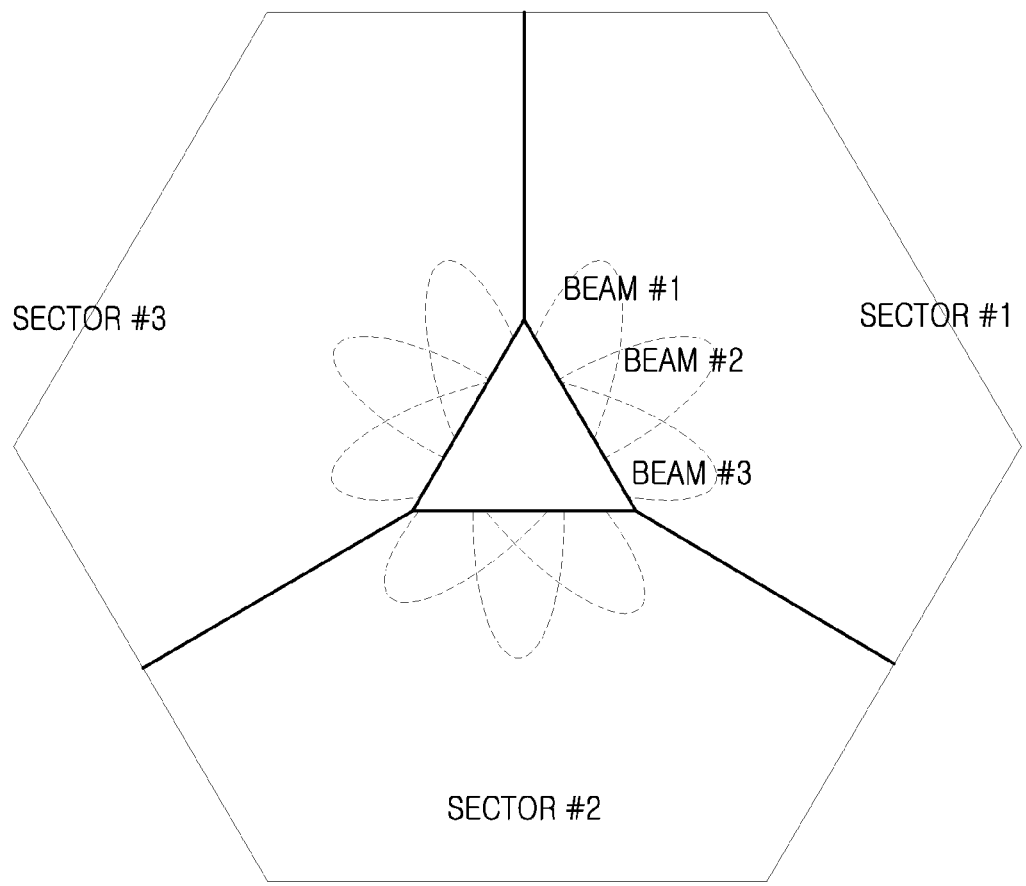
FIG. 3 is a diagram illustrating beams of a base station applying a beamforming technique in the wireless communication system.
Figure 4A:
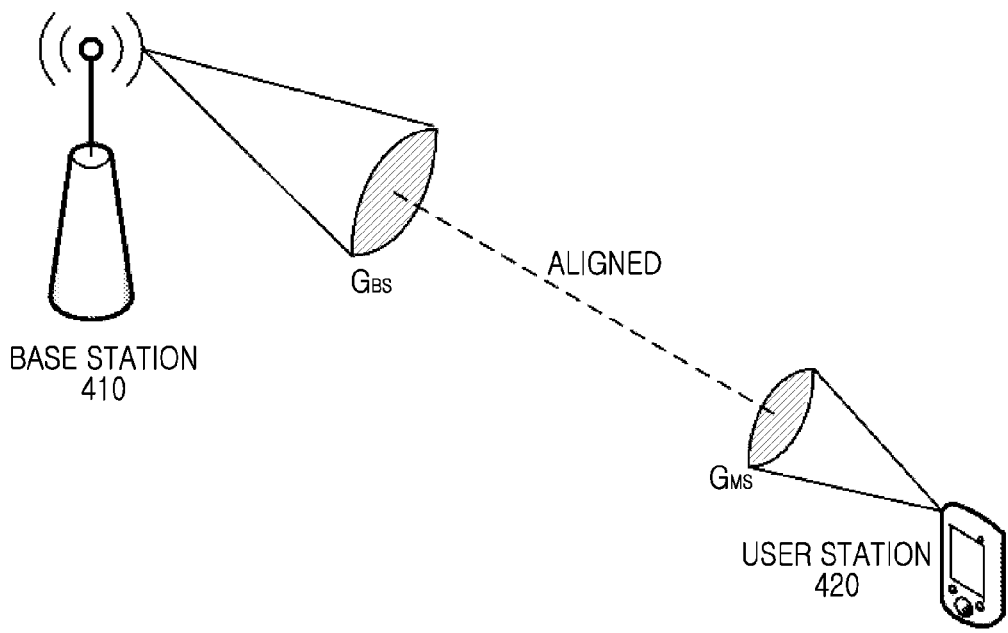
FIGS. 4A to 4D a diagrams illustrating beam directions of a base station and a user station in a wireless communication system, according to an embodiment of the present invention.
Figure 4B:
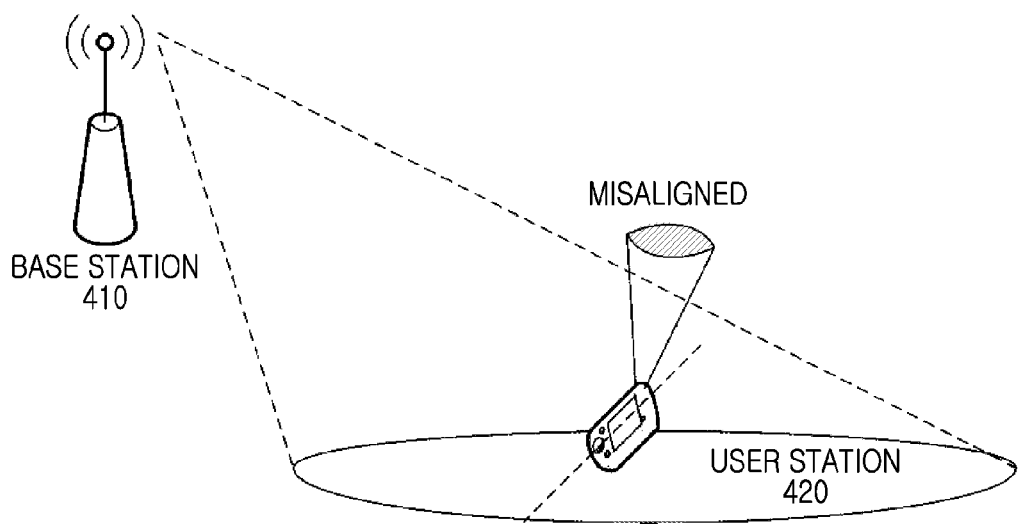
Figure 4C:
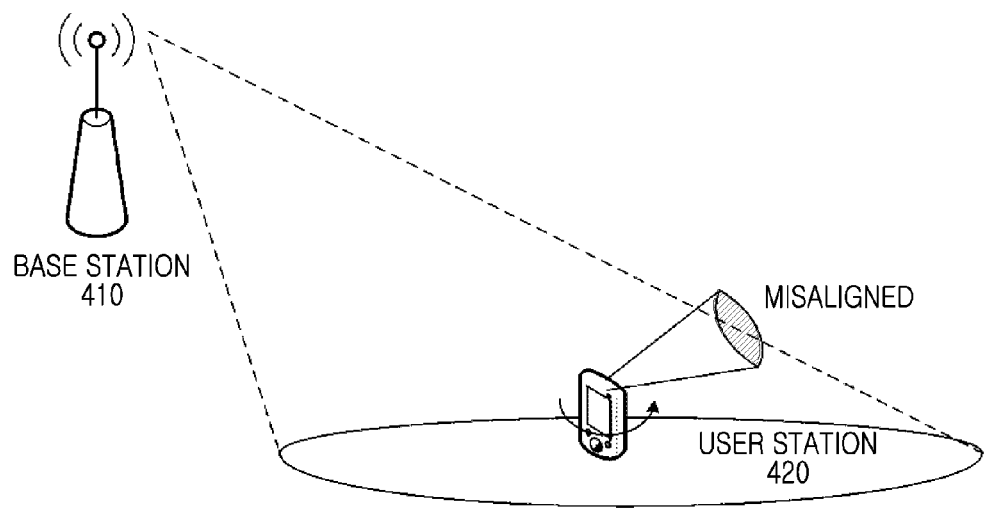
Figure 4D:
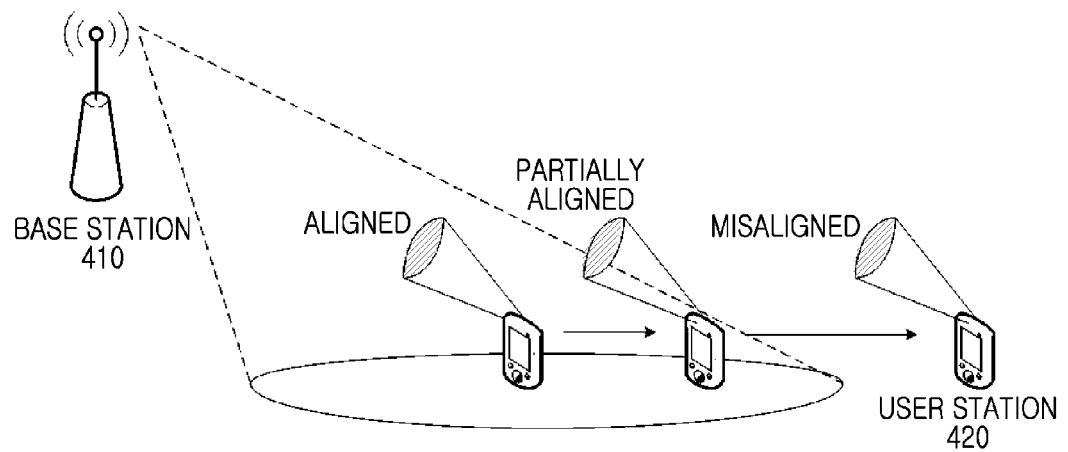

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but, are merely used by the inventor to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" means that a characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The embodiments of the present invention provide a technique for retaining a beam direction of a user station in a wireless communication system.

In order to overcome beam direction misalignment, it is necessary to measure the motion and movement of the user station in the embodiments of the present invention. The motion and movement of the user station can be measured in various manners. For example, the motion and movement of the user station can be measured by sensors described in detail below, in accordance with embodiments of the present invention.

An acceleration sensor detects a change in gravity and thus measures acceleration according to the motion or movement in a three-dimensional space. Using the acceleration sensor, a direction of the tilt, an angle of the tilt, an angular velocity of the tilt, an angular acceleration of the tilt, a movement direction, a distance, a velocity, and an acceleration of the apparatus can be measured in the three-dimensional space.

A gyro sensor measures rotation on a three-dimensional rotation axis, and relies on the property that an object on the three-dimensional rotation axis is apt to maintain the stationary state. Using the gyro sensor, a rotation direction, a rotation angle, a rotation angular velocity, and a rotation angular acceleration of the apparatus can be measured in the three-dimensional space.

A compass sensor can measure a current direction and a directional change of the apparatus based using principles of a compass.

A Global Positioning System (GPS) can accurately measure a current location of the apparatus as latitudinal and longitudinal coordinates by receiving a location signal from a satellite. The GPS can be used to measure current location information and the location change of the apparatus.

An altitude sensor measures a barometric pressure using a sensor for measuring the pressure, and thus measures an absolute altitude value expressed with respect to sea-level.

Using one or more of the above sensors, the information of the motion or movement of the user station can be measured in the three-dimensional space. The present invention is not limited those sensors, and other sensors can be employed for such measurement.

FIGS. 5A-5C are diagrams illustrating a method for measuring the motion and movement of the user station using the sensors in the wireless communication system, according to an embodiment of the present invention. Specifically, FIGS. 5A-5C illustrate the measurement of the tilt, the rotation, and the location change of the user station according to the movement of the user station, using at least one of the above-described sensors.

FIG. 5A illustrates the measurement of the tilt angle on three axes (i.e., the x axis, the y axis, and the z axis), which construct the three-dimensional space, using the acceleration sensor, according to an embodiment of the present invention. Referring to FIG. 5A, a single-axis acceleration sensor can measure a value $\theta_z$ indicating a slope in the vertical direction (the z axis). A biaxial or triaxial acceleration sensor can measure values $\theta_x$ and $\theta_y$ indicating a slope in the horizontal directions (the x axis and the y axis). The angular velocity $d\theta/dt$ and the angular acceleration $(d^2\theta)/(d^2t)$, which are the changes in angles based on time, can be measured as well. The acceleration sensor may be used together with the compass sensor. The compass sensor can provide a reference of the absolute direction in the horizontal direction. Hence, when the single-axis acceleration sensor and the compass sensor are used together, a result can be attained that is equivalent to that obtained from the triaxial acceleration sensor. Using the acceleration sensor alone, relative change values of the angle, the angular velocity, and the angular acceleration can be acquired. However, when the acceleration sensor and the compass sensor are used together, the change of the absolute values of the angle, the angular velocity, and the angular acceleration can be obtained. Thus, the compass sensor can be used to set a reference direction of the acceleration sensor.

FIG. 5B illustrates the measurement of the rotation angle on the three axes (i.e., the x axis, the y axis, and the z axis) of the three-dimensional space using the gyro sensor, according to an embodiment of the present invention. Using the gyro sensor, rotation angles $\phi_1$, $\phi_2$ and $\phi_3$ on the x (pitch), y (roll), and z (yaw) axes can be measured. Depending on the number of the rotation axes to measure, one of first-axis, biaxial, and triaxial gyro sensors can be used. The rotation angular velocity $d\phi/dt$ and the rotation angular acceleration $(d^2\phi)/(d^2t)$, which are changes in rotation based on the time, can be measured as well. The gyro sensor can be used together with the compass sensor. The compass sensor provides a reference of the absolute direction in the horizontal direction. Hence, when using the gyro sensor alone, relative change values of the rotation angle, the rotation angular velocity, and the rotation angular acceleration can be obtained. By contrast, when using the gyro sensor and the compass sensor together, absolute value changes of the rotation angle, the rotation angular velocity, and the rotation angular acceleration can be obtained. Thus, the compass sensor can be used to set a reference direction of the gyro sensor.

FIG. 5C illustrates the measurement of small motion and movement state on the three axes (i.e., the x axis, the y axis, and the z axis), which form the three dimensional space, using the GPS, the compass sensor, the altitude sensor, and the acceleration sensor, according to an embodiment of the present invention. Using the GPS, the compass sensor, the altitude sensor, and the acceleration sensor, a location in the altitude (the z axis) and ground surface (the x axis and the y axis) directions can be measured. The GPS, the compass sensor, the altitude sensor, and the acceleration sensor can also measure velocity values dx/dt, dy/dt and dz/dt and acceleration values $(d^2x)/(d^2t)$, $(d^2y)/(d^2t)$ and $(d^2z)/(d^2t)$, which are location changes based on the time. The GPS facilitates the measurement of the location change of the apparatus moving at a velocity in the horizontal direction, rather than precisely measuring the change of the motion in the stationary state, and provides the absolute latitude and longitude coordinates, not the relative coordinates. Hence, there is no need to separately define a reference location. Using the compass sensor, it is easy to measure the change of the direction of the apparatus moving at a velocity in the horizontal direction. The altitude sensor can measure the absolute altitude value with regard to the motion or the movement in the vertical direction. By contrast, the acceleration sensor can measure the change in the vertical and horizontal motions in the stationary state, and also measure the location change of the apparatus moving at a velocity. Since the acceleration sensor provides the change value of the relative location, not the absolute coordinates, the reference location needs to be defined. Since the absolute reference location and reference direction in the horizontal and vertical directions can be acquired using the GPS, the compass sensor, and the altitude sensor together with the acceleration sensor, the absolute coordinates can be measured.

Figure 6:
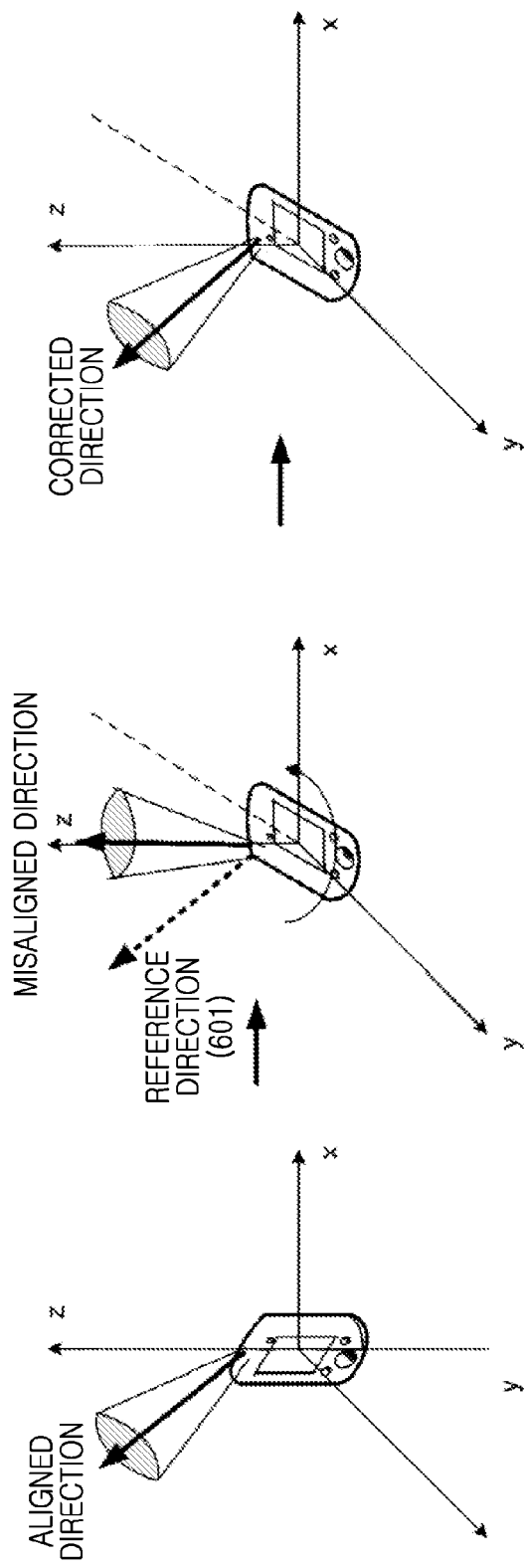
FIG. 6 is a diagram illustrating beam directions corrected based on the motion of the user station in the wireless communication system, according to an embodiment of the present invention.

FIG. 6 is a diagram illustrating beam directions corrected based on the motion of the user station in the wireless communication system, according to an embodiment of the present invention.

Referring to FIG. 6, when the beam direction between the base station and the user station is aligned, the user station sets the aligned beam direction to a reference direction 601. For example, the reference direction 601 of the beam direction can be set by the aforementioned beam training. Alternatively, the reference direction 601 of the aligned beam direction can be defined based on location information between the base station and the user station. Other schemes can be adopted to set the reference direction 601. For example, when the GPS, the compass sensor, and the altitude sensor capable of measuring the absolute location or direction are usable, the user station can set the accurate location or direction of the three-dimensional direction to the reference direction 601. When the acceleration sensor or the gyro sensor is available, the user station can set a reference value corresponding to the reference direction 601 to '0' and measure the relative angle or the rotation angle.

When tilt and rotation caused by the motion of the user station, and the beam direction based on the movement of the user station changes, the user station measures the change against the reference direction. Specifically, the user station measures a physical change value in three dimensions. The three-dimensional physical change value can be measured as the angle, the angular velocity, the angular acceleration, the rotation angle, the rotation angular velocity, the rotation angular acceleration, the movement distance, the movement velocity, and the movement acceleration in the horizontal (i.e., the x axis and the y axis) and vertical (i.e., the z axis) directions. The physical change value can be measured in various manners. In embodiments of the present invention, the physical change value can be measured using various sensors. For example, the sensors can include at least one of the acceleration sensor, the compass sensor, an angular velocity sensor, the altitude sensor, the gyro sensor, and the GPS.

The user station maintains the beam direction in the reference direction 601 by correcting the beam direction according to the physical change value. For example, when the user turns his/her head or moves while talking over the phone, the beam direction of the user station aligned with the base station alters. When the space is represented with orthogonal directions of the x axis, the y axis, and the z axis and the beam direction rotates 30 degrees from the reference direction 601 in the z axis, the beam direction of the user station stays in the reference direction 601 by turning the beam direction of the user station to −30 degrees in the z axis. Accordingly, although the beam direction of the user station rotates 30 degrees, the base station can still communicate with the user station in the existing beam direction regardless of the beam direction rotation of the user station. More specifically, when the present algorithm for compensating for the beam direction directly by the user station is executed for the physical direction and location changes caused by the motion or the movement of the user station, the base station communicates with the user station as if the base station is not physically moving. In this case, effective beamforming without system overhead is achieved in the uplink and downlink communication between the base station and the user station.

The techniques for retaining the beam direction include setting the beam direction of the user station for maintaining the optimal communication quality between the base station and the user station to the reference direction, measuring the physical change value when the beam direction changes, and compensating for the beam direction based on the measured physical change value. Herein, the technique for retaining the beam direction is referred to as a beam locking scheme. The beam locking scheme is applicable to any station that can move in the wireless communication system and that adopts the beamforming technique.

Figure 7:
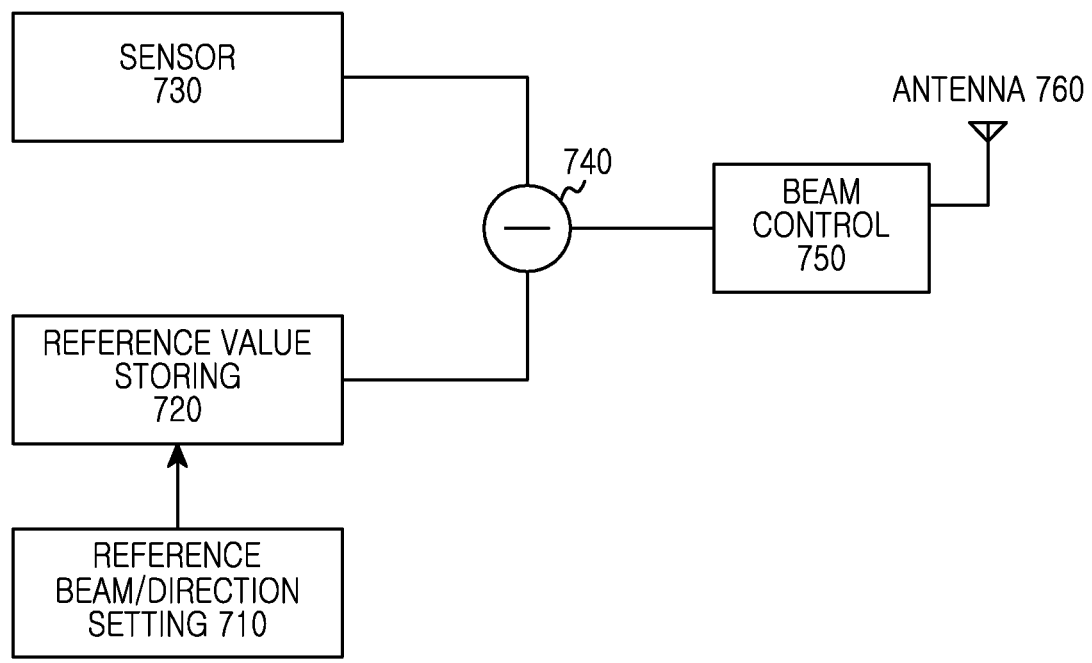
FIG. 7 is a block diagram illustrating control of beam misalignment in the wireless communication system, according to an embodiment of the present invention.

FIG. 7 is a block diagram illustrating control of the beam misalignment in the wireless communication system, according to an embodiment of the present invention.

Referring to FIG. 7, in order to control beam misalignment, a reference beam/direction setting block 710, a reference value storing block 720, a sensor block 730, an operation 740, a beam control block 750, and an antenna 760 are required.

The reference beam/direction setting block 710 selects an optimal beam and/or beam direction that maximizes communication quality between the base station and the user station. The reference beam/direction setting block 710 also sets the optimal beam direction as the reference direction for the beam locking procedure. One example of selecting the optimal beam and/or beam direction, which maximizes the communication quality, is the above-described beam training procedure. The reference direction of the reference beam/direction setting block 710 can be set independently of the beam locking scheme. For example, the reference direction can be set on a periodic basis at regular time intervals, or when a predefined event occurs.

The reference value storing block 720 is a storage means, such as a memory, which stores the reference value representing the reference beam and/or beam direction set by the reference beam/direction setting block 710 as a physical numerical value. The reference value can be an absolute value based on the location information, or can be set to zero. A detailed form of the reference value can vary according to the type of the sensor usable by the user station. When the GPS, the compass sensor, and the altitude sensor are used, the reference value can be defined as an absolute value. More specifically, when the GPS is used, the reference value can be expressed as latitudinal and longitudinal coordinates indicating the user's location in the horizontal direction. When the compass sensor is used, the reference value can be expressed as an angle indicating the rotation angle based on north in the horizontal direction. When the altitude sensor is used, the reference value can be expressed as an altitude value based on sea-level in the vertical direction. When the acceleration sensor or the gyro sensor is used, the reference value can be expressed as a relative value. Since the absolute direction value is not measured solely using the acceleration sensor or the gyro sensor, the beam and/or beam direction of the best communication quality can be set to zero.

The sensor block 730 detects a change in the beam direction of the user station according to the motion or movement of the user station. The sensor block 730 includes at least one of the acceleration sensor, the gyro sensor, the compass sensor, the altitude sensor, and the GPS. The sensor block 730 can include other sensors for detecting the motion and/or movement in addition to the above-described sensors. The sensor block 730 repeatedly measures the values of one or more of the angle, the angular velocity, the angular acceleration, the rotation angle, the rotation angular velocity, the rotation angular acceleration, the movement distance, the movement velocity, and the movement acceleration in the horizontal (i.e., the x axis and the y axis) and vertical (i.e., the z axis) directions of the three-dimensional space at regular time intervals. The output values of the sensor block 730 can vary depending on the type and the characteristics of the sensor in the user station, and the defined form of the reference value. For example, when the output value of the sensor block 730 is a velocity value (e.g., the movement velocity, the angular velocity, and the rotation angular acceleration) and the reference value is the movement distance, the angle, and the rotation angle, the sensor block 730 needs to integrate and convert the measured velocity value to the reference value. However, the conversion operation can be carried out by a separate block, other than the sensor block 730. For example, when the output value of the sensor block 730 is the acceleration value (e.g., the movement acceleration, the angular acceleration, and the rotation acceleration) and the reference value is the movement distance, the angle, and the rotation angle, the output needs to be converted to the reference value through two integrations in the time axis.

The operation 740 calculates a difference value between the output value of the sensor block 730 and the reference value stored to the reference value storing block 720. Specifically, the operation block 740 calculates the difference value, determines a deviation value using the difference value, and outputs the deviation value. The deviation value is provided as input to the beam control block 750 for regulating the beam direction of the user station and for applying the actual beam locking scheme. The deviation value can be determined and output as the cycle of the output value in the sensor block 730.

The beam control block 750 forms a beam that makes the deviation value '0' or smaller than a particular threshold, using the deviation value output from the operation 740. The deviation value can be provided as a value such as a three-dimensional angle or rotation angle. When the deviation value is provided as a movement distance or coordinate value, the beam control block 750 converts the deviation value of the actual beam direction, which is misaligned, to an angle value or rotation angle value using an inverse trigonometric function of sine, cosine, and tangent. The conversion operation can be conducted by a separate block, other than the beam control block 750. A detailed construction of the beam control block 750 can vary according to the beamforming scheme. For example, the beam control block 750 can conform to at least one of digital beamforming, analog beamforming, hybrid beamforming, and beamforming where the antenna direction is mechanically adjusted. If the antenna 760 includes a plurality of antenna groups having different fixed beam directions, the beam control block 750 forms the beam by activating or deactivating antenna groups. In this case, the bean control block 750 selects an index of antenna group to be activated.

The antenna 760 includes a plurality of antennas for radiating a signal. The antenna 760 can include an array including a plurality of antennas or at least one antenna having a static radiation pattern, i.e., a horn antenna. Specifically, the antenna block 760 includes at least one directional antenna. The directional antenna is any antenna having directivity. The antenna block 760 forms the transmit and receive beams according to the beamforming of the beam control block 750.

Figure 8A:
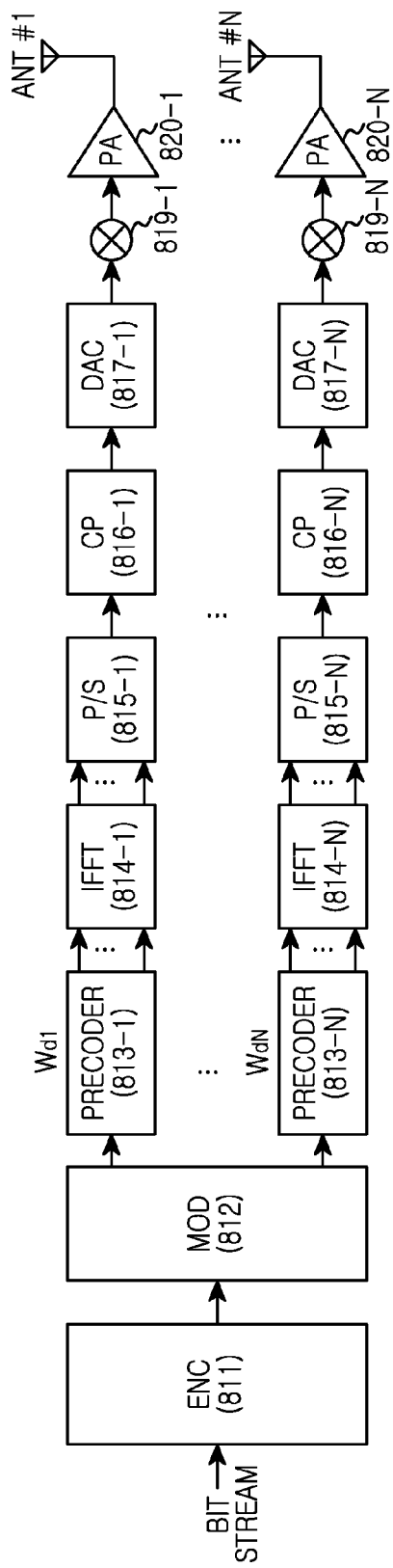
FIGS. 8A to 8C are diagrams illustrating components for beamforming in the wireless communication system, according to an embodiment of the present invention.
Figure 8B:
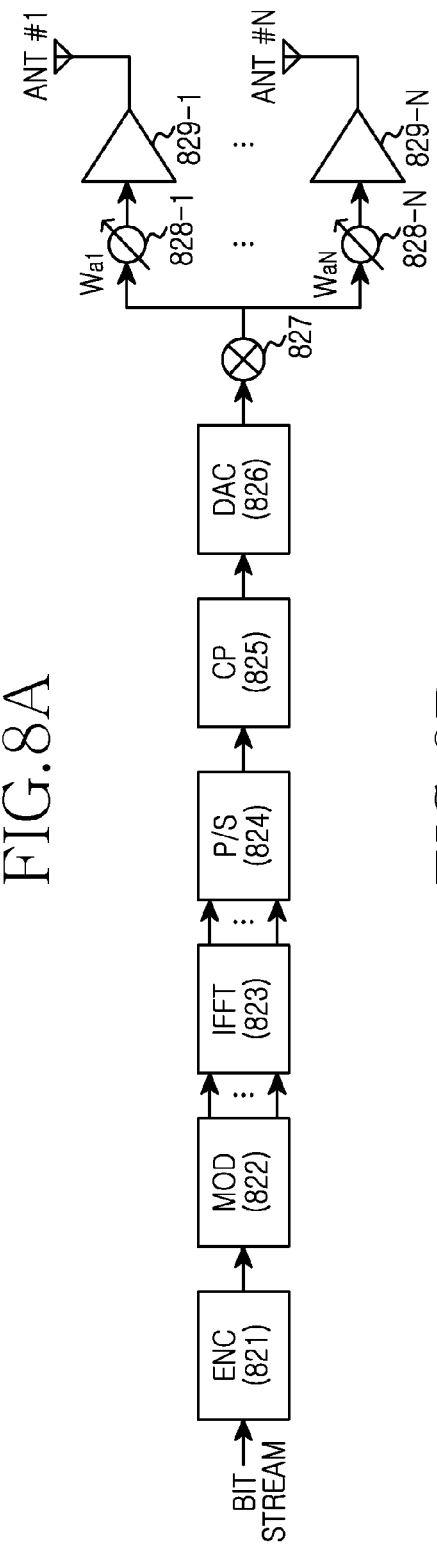
Figure 8C:
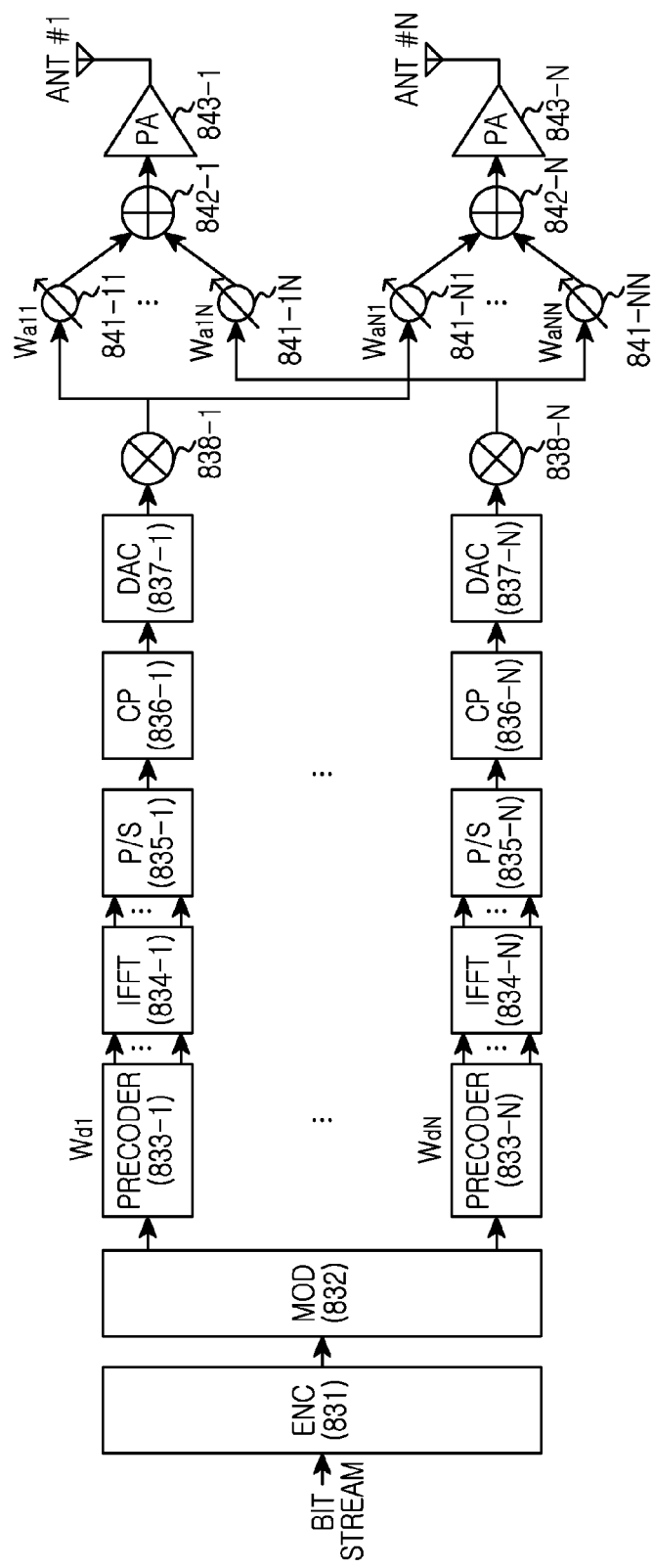

FIGS. 8A, 8B and 8C are block diagrams for beamforming in the wireless communication system, according to an embodiment of the present invention.

Beamforming is classified into digital beamforming and analog beamforming according to when the beamforming is performed. A difference between digital beamforming and analog beamforming is in that a beamforming parameter for determining the beam direction is determined before or after a Digital to Analog Converter (DAC). Digital beamforming multiples the beamforming parameter by a bit stream before the DAC. In analog beamforming, the beamforming parameter adjusts a magnitude or phase of signals to transmit over the antennas after the DAC. When both of digital beamforming and analog beamforming are performed, hybrid beamforming is available.

FIG. 8A is a block diagram of an apparatus for the digital beamforming. Referring to FIG. 8A, an information bit stream is converted into a complex symbol stream through an encoder 811 and a modulator 812. When independent digital information is transmitted per antenna, the complex symbols are multiplexed and output to the respective paths. When the same digital information is transmitted over all of the antennas, the same complex symbols are output to every path. The complex symbols are multiplied by beamforming parameters $W_{d1}$ to $W_{dN}$ at precoders 813-1 to 813-N of the respective paths. The complex symbols are converted to Orthogonal Frequency Division Multiplexing (OFDM) symbols via IFFT operators 814-1 to 814-N, Parallel to Serial (P/S) converters 815-1 to 815-N and Cyclic Prefix (CP) inserters 816-1 to 816-N. The OFDM symbols, which are digital signals, are converted to analog signals via DACs 817-1 to 817-N. The analog signals of the paths are converted to Radio Frequency (RF) signals by mixers 819-1 to 819-N, amplified through Power Amplifiers (PAs) 820-1 through 820-N, and transmitted over the antennas #1 through #N. As described above, the digital beamforming provides the DACs 817-1 through 817-N per antenna, and the beamforming parameter is multiplied by the complex symbol before the DACs 817-1 through 817-N. Accordingly, given N antennas, the beamforming parameter of the digital beamforming includes $W_{d1}$ to $W_{dN}$ and each factor of the parameter is a complex number. When a plurality of antenna groups constitutes one antenna, a Multiple Input Multiple Output (MIMO) scheme can be adopted. In this case, the beamforming parameter $W_{d1}$ to $W_{dN}$ is defined per antenna group, and each factor of the beamforming parameter is a matrix of a vector including complex numbers.

FIG. 8B is a block diagram of an apparatus for analog beamforming. Referring to FIG. 8B, the information bit stream is converted into a complex symbol stream by an encoder 821 and a modulator 822. The complex symbols are converted to OFDM symbols via a IFFT operator 823, a P/S converter 824 and a CP inserter 825. The OFDM symbols, which are digital signals, are converted into analog signals by a DAC 826, and are converted to RF signals by a mixer 827. Each of the RF signals is input to a path of each antenna, changed in magnitude and phase through phase/magnitude converters 828-1 to 828-N, amplified by PAs 829-1 to 829-N, and transmitted over the antennas #1 through #N. As described above, the analog beamforming channel-codes, modulates, and analog-converts the information bit stream, changes the magnitude or the phase of the analog signal before transmission over the antennas, and thus, determines the beam direction transmitted at each antenna. For example, when the beamforming parameter is $W_{a1}$ to $W_{aN}$ per antenna, each factor of the beamforming parameter includes at least one of a magnitude value and a phase value of the signal per antenna. Analog beamforming can change the magnitude value and the phase value at the same time, or adjust the phase value alone. When a plurality of antenna groups constitutes one antenna, the MIMO scheme can be adopted. In this case, the beamforming parameter $W_{a1}$ to $W_{aN}$ is defined per antenna group, and each factor of the beamforming parameter is a matrix or a vector including at least one of a magnitude value and a phase value of the signal per antenna group.

FIG. 8C is a block diagram of an apparatus for hybrid beamforming, according to an embodiment of the present invention. Referring to FIG. 8C, the information bit stream is converted into a complex symbol by an encoder 831 and a modulator 832. Similar to FIG. 8A, the complex symbols are multiplied by beamforming parameters $W_{d1}$ to $W_{dN}$ at precoders 833-1 to 833-N of the paths. The complex symbols are converted to OFDM symbols via IFFT operators 834-1 to 834-N, P/S converters 835-1 to 835-N and CP inserters 836-1 to 836-N. The OFDM symbols, that are digital signals, are converted to analog signals by DACs 837-1 to 837-N, and converted to RF signals by mixers 838-1 to 838-N. Similar to FIG. 8B, the digital beamformed signals of the paths are changed in magnitude and phase by phase/magnitude converters 841-11 to 841-1N, . . . , 841-N1 to 841-NN of the antenna paths. Signals to be transmitted to the same antenna are summed by adders 842-1 to 842-N. Summed signals are amplified by PAs 843-1 to 843-N of the antenna paths, and then transmitted over the respective antennas #1 through #N. As described above, hybrid beamforming includes both of digital beamforming and analog beamforming. In this case, the beamforming parameter includes $W_{d1}$ to $W_{dN}$ for digital beamforming and $W_{a1}$ to $W_{aN}$ for analog beamforming, and the beamforming parameter of the two types controls the beamforming independently or based on a particular relational expression.

FIGS. 8A, 8B and 8C are diagrams illustrating transmit beamforming. For receive beamforming, the DAC is replaced by an Analog to Digital Converter (ADC), the encoder is replaced by a decoder, the modulator is replaced by a demodulator, and the direction of the amplifier and the transfer direction of the signal are changed from the right to the left.

Figure 9:
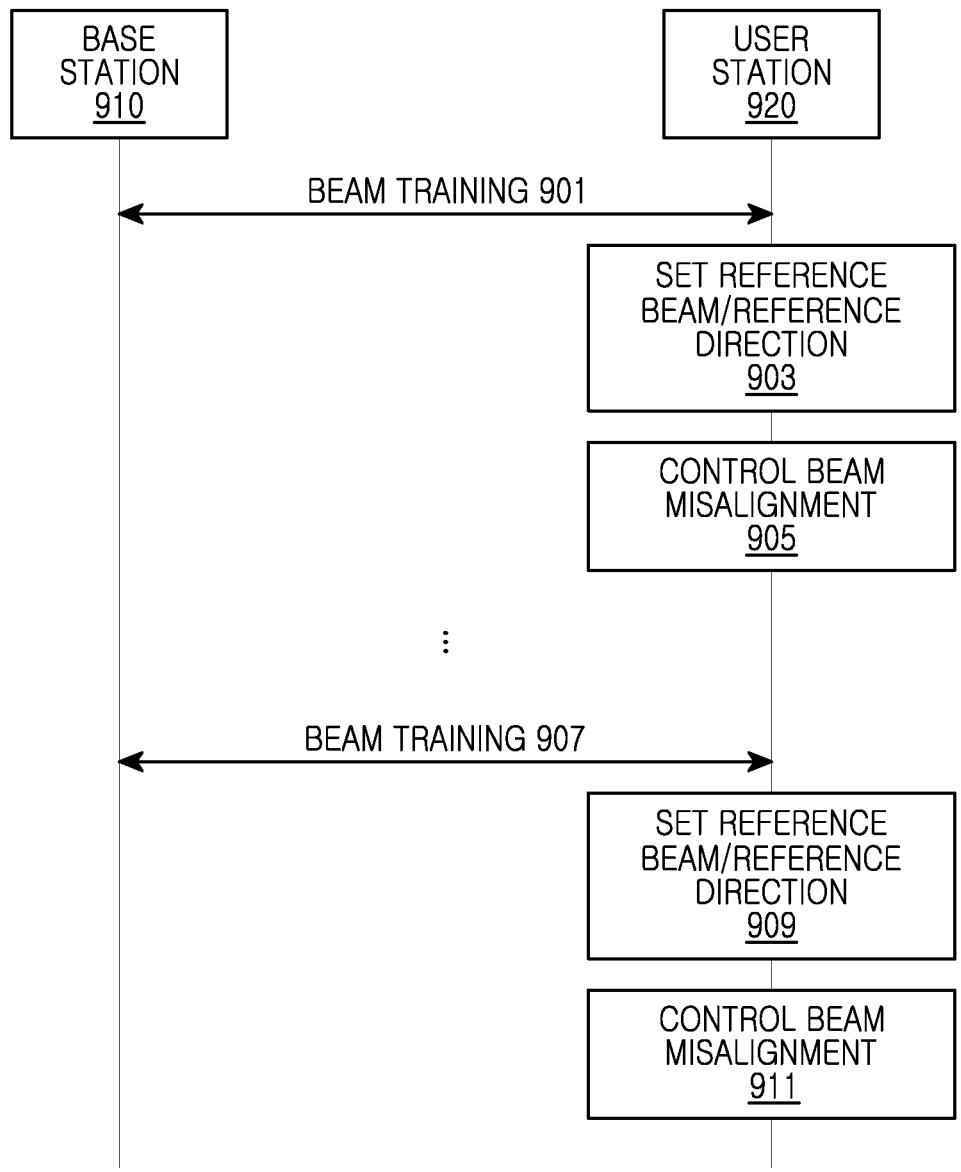
FIG. 9 is a diagram illustrating a signaling process for beam control in the wireless communication system, according to an embodiment of the present invention.

FIG. 9 is a diagram illustrating a signaling process for the beam control in the wireless communication system, according to an embodiment of the present invention.

Referring to FIG. 9, in step 901, a base station 910 and a user station 920 perform beam training. The base station 910 and the user station 920 can each perform beamforming. The user station 920 selects a beam having the best reception state from amongst the transmit beams of the different directions of the base station 910, and the base station 910 selects a beam having the best reception state from amongst the transmit beams of the different directions of the user station 920. As described above, the determination of the best beam direction can be referred to as beam training. Beam training can be conducted before or after data exchange on a periodic basis or when necessary.

After selecting the preferred beam of optimal transmission and reception efficiency through beam training, the user station 920 sets the direction of the preferred beam as the reference direction, in step 903. The reference direction can be set to an absolute value or a relative value depending on which sensor is mounted to the user station 920.

In step 905, the user station 920 independently performs beam misalignment control without the aid of the base station 910. Specifically, the user station 920 overcomes beam misalignment according to the beam locking scheme of the embodiments of the present invention. More specifically, when the beam direction between the base station 910 and the user station 920 is misaligned due to the motion or movement of the user, the user station 920 performs the beam misalignment control procedure to correct the misalignment. Thus, the beam aligned between the base station 910 and the user station 920 is retained to maximize the transmission and reception efficiency.

In step 907, the base station 910 and the user station 920 repeat the beam training. Herein, step 907 can be carried out according to a predefined cycle of beam training or when necessary. Specifically, even when the beam alignment is retained using the beam locking scheme, the base station 910 and the user station 920 conduct beam training on a relative long cycle and because stable beam alignment is guaranteed. The user station 920 sets a new reference direction for the beam alignment, in step 909, and performs beam misalignment control, in step 911.

The beam reference direction can be reset at any time through the beam training. After the resetting, the beam misalignment is controlled with the new reference direction value.

The beam training procedure and the beam misalignment control procedure for beam locking can be performed in time order. In other embodiments of the present invention, the beam training and the beam misalignment control can be carried out independently. In this situation, the user station continues the beam misalignment control using the sensor, and the beam training updates the reference direction of the beam regardless of the beam misalignment control. Hence, the beam locking method of the present invention does not necessarily include the beam training procedure.

Operations and structure of the apparatus for beam locking, as described above, are described in greater detail below.

Hereinafter, it is assumed that the reference direction of the beam between the base station and the user station is set prior to beam locking. The reference beam direction can be initially set between the base station and the user station, periodically reset, or reset if necessary. For example, the apparatus can set the beam direction to a plurality of candidate directions, repeatedly send the training reference signal, and select the candidate direction of the aligned beam direction. In addition, the apparatus can refine the beam width to use a narrower beam.

Figure 10:
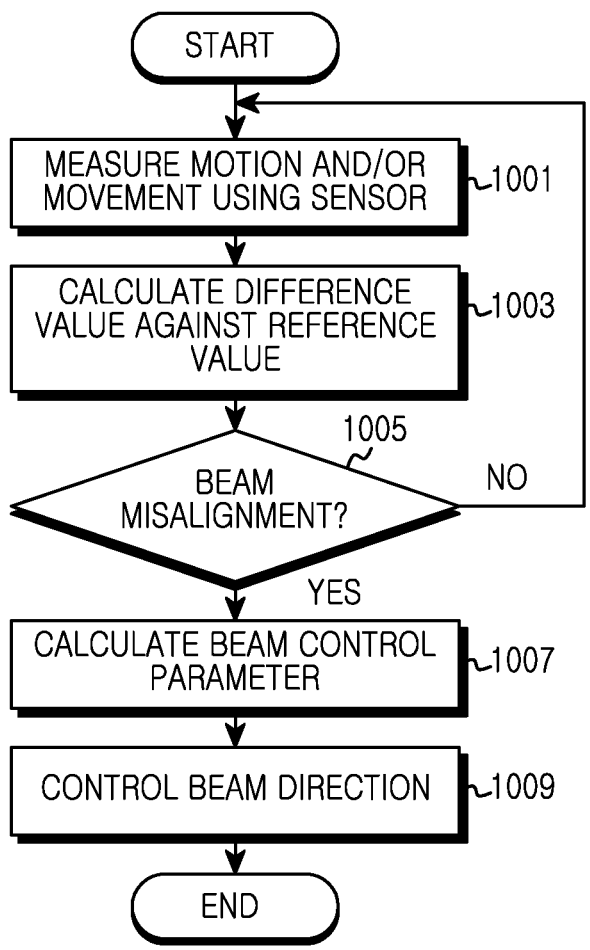
FIG. 10 is a diagram illustrating a beam locking method in the wireless communication system, according to an embodiment of the present invention.

FIG. 10 illustrates a beam locking method in the wireless communication system, according to an embodiment of the present invention.

Referring to FIG. 10, the apparatus measures physical values for the movement and/or motion of the apparatus according to the movement and/or motion of the user using at least one motion recognition sensor, in step 1001. For example, the at least one motion recognition sensor can include at least one of the acceleration sensor, the compass sensor, the gyro sensor, the altitude sensor, and the GPS, as described in FIG. 5 above. The physical values include at least one of the absolute angle value, the rotation angle value, and the location value according to the tilt, the rotation, or the movement in the three-dimensional space (i.e., the x axis, the y axis, and the z axis) based on the time variation. More specifically, the physical values include at least one of the direction of the motion or the movement, the distance of the motion or the movement, the velocity of the motion or the movement, the acceleration of the motion or the movement, the direction of the tilt, the angle of the tilt, the angular velocity of the tilt, the angular acceleration of the tilt, the direction of the rotation, the angle of the rotation, the angular velocity of the rotation and the angular acceleration of the rotation in a three-dimensional space, the current direction, the change of the direction, the location coordinates and the change of the location coordinates in the horizontal direction based on north, and the altitude and the change of the altitude due to at least one of the motion and the movement.

In step 1003, the apparatus calculates the difference value between the reference value and the physical values measured by the at least one motion recognition sensor. The reference value indicates the physical values corresponding to the reference direction. Specifically, the apparatus calculates how much the physical values. such as angle, rotation angle, and location, change from the reference value according to the movement and/or the motion measured in step 1001. For example, the apparatus can calculate the deviation value based on Equation (2) below.

$$D=V-R \qquad (2)$$

In Equation (2), D denotes the deviation, V denotes the value measured by the at least one motion recognition sensor, and R denotes the reference value.

Alternatively, the apparatus can calculate the deviation value based on Equation (3) below.

$$D=f(V-R) \qquad (3)$$

In Equation (3), D denotes the deviation, V denotes the value measured by the at least one motion recognition sensor, R denotes the reference value, and $f(\ )$ denotes a function for processing the value (V−R) to facilitate the processing of the deviation value. For example, since (V−R) can be a negative real number, to derive the meaningful D all the time, $f(\ )$ can be a function for calculating an absolute value which always makes D a positive real number. As another example, to make D a probabilistic standard deviation value, $f(\ )$ can be a function for calculating a square of (V−R), or a function for calculating a square of a difference value of squares of V and R.

In step 1005, the apparatus determines whether beam misalignment occurs using the difference value calculated in step 1003. For example, when D is zero, the misalignment of the beam direction has not occurred. When the change degree is slight and D is not zero, the misalignment of the beam direction has not occurred. Specifically, when D does not exceed a threshold D', the apparatus can determine that the misalignment of the beam direction has not occurred. For example, when a parameter for the physical change of the value D is (a,b,c), and a parameter for the physical change of the threshold D' is (a',b',c'), the misalignment of the beam direction can be determined only when at least one of a≥a', b≥b' and c≥c' is satisfied. The value (a,b,c) can vary according to the type of the sensor used by the user station. The three-dimensional physical change value can be measured in the form of the angle, the angular velocity, the angular acceleration, the rotation angle, the rotation angular velocity, the rotation angular acceleration, the movement distance, the movement velocity, and the movement acceleration of the horizontal (i.e., the x axis and the y axis) and vertical (i.e., the z axis) directions. When the value (a,b,c) has a physical value of a different type from the reference value, it is necessary to convert the value (a,b,c) to a value indicating the actual beam direction. For example, when the value (a,b,c) is given as the time variation value, the apparatus can convert this value to a new value (a1,b1,c1) through the integration. When beam misalignment does not occur, the apparatus returns to step 1001 to measure motion and/or movement.

When beam misalignment occurs, the apparatus calculates the beam control parameter for correcting the beam misalignment, in step 1007. Specifically, the apparatus converts the difference value calculated in step 1003 to the value for controlling beamforming. In doing so, the detailed form of the beam control parameter can vary according to the beamforming scheme. For example, the beam control parameter can be at least one of a beamforming matrix including complex numbers used at a digital stage and a beamforming vector. The beam control parameter can be a precoding codebook index value of the transmitter or a postcoding codebook index value of the receiver, by mapping the beamforming matrix or vector to an index value. When analog beamforming is conducted, the beam control parameter can be phase and magnitude values per antenna. As for beamforming that physically moves the antenna, the beam control parameter can be a physical control value such as rotation or tilt. For example, when antennas, antenna bundles, or antenna arrays corresponding to the respective beam directions are equipped in advance and a beam index or an antenna index is allocated to each beam direction, the beam control parameter can include at least one of the beam index and the antenna index.

The beam control parameter can be interpreted as a result value of a function that uses the physical change value as an input variable. In more detail, when the beam control parameter in the reference direction is expressed as W, $W=[w_1, \ldots, w_N]$. Specifically, when the beam is formed through beamforming for each of N antennas or N antenna groups, W can be expressed as N vector values. The vector values become the beam control parameter. The beam control parameter can be determined by the function value taking the value D of Equation (1) and Equation (2) as the input variable. The beam control parameter can be provided as set forth in Equation (4) below.

$$W = f(D) \quad (4)$$

In Equation (4), W denotes the beam control parameter, D denotes the deviation between the value measured by the sensor and the reference value, and $f( )$ denotes a function for calculating W from D. $f( )$ can be defined in various ways based on the beamforming scheme and the type of the sensor used by the user station.

After calculating the beam control parameter, the apparatus controls the beam direction using the beam control parameter in step 1009. Specifically, the apparatus applies the beam control parameter calculated in step 1007 to beamforming. Hence, the apparatus can address the beam misalignment determined in step 1005.

Although not illustrated in FIG. 10, the apparatus can set the reference direction before measuring the motion and/or movement in step 1001. For example, the apparatus can set the reference direction through the beam training procedure. For instance, the apparatus can set the beam direction to a plurality of candidate directions, repeatedly transmit the training reference signal, and select the candidate direction of the aligned beam direction. In addition, the apparatus can refine the beam to use a narrower beam.

Although it is not illustrated in FIG. 10, the apparatus can determine whether the motion or movement occurs before measuring the motion and/or movement in step 1001. Upon detecting the motion or the movement, the apparatus performs steps 1001 to 1009.

Figure 11:
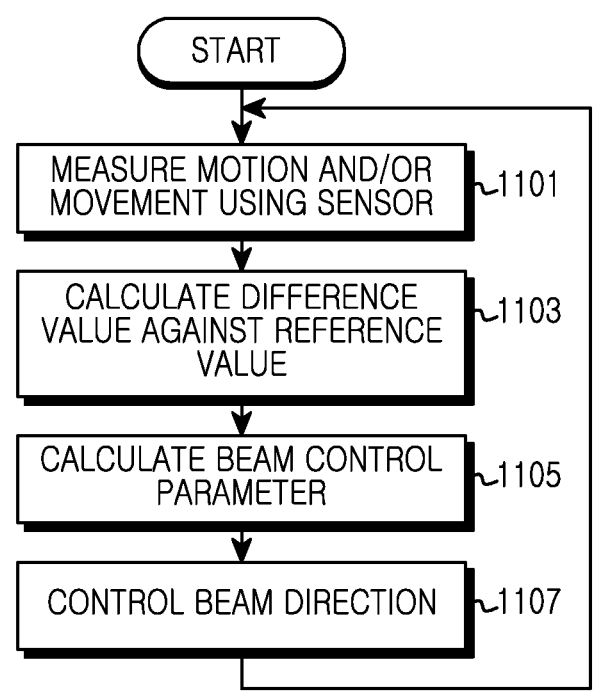
FIG. 11 is a diagram illustrating a beam locking method in the wireless communication system, according to another embodiment of the present invention.

FIG. 11 is a diagram illustrating the beam locking method in the wireless communication system, according to another embodiment of the present invention.

Referring to FIG. 11, the apparatus measures physical values for the movement and/or the motion of the apparatus according to the movement or the motion of the user using at least one motion recognition sensor, in step 1101. For example, the at least one motion recognition sensor can include at least one of the acceleration sensor, the compass sensor, the gyro sensor, the altitude sensor, and the GPS as described above in FIG. 5. The physical values include at least one of the absolute angle value, the rotation angle value, and the location value according to the tilt, the rotation, or the movement in the three-dimensional space (i.e., the x axis, the y axis, and the z axis) based on time variation. More specifically, the physical values include at least one of the direction of the motion or the movement, the distance of the motion or the movement, the velocity of the motion or the movement, the acceleration of the motion or the movement, the direction of the tilt, the angle of the tilt, the angular velocity of the tilt, the angular acceleration of the tilt, the direction of the rotation, the angle of the rotation, the angular velocity of the rotation and the angular acceleration of the rotation in a three-dimensional space, the current direction, the change of the direction, the location coordinates and the change of the location coordinates in the horizontal direction based on north, and the altitude and the change of the altitude due to at least one of the motion and the movement.

In step 1103, the apparatus calculates the difference value between the reference value and the physical values measured by the at least one motion recognition sensor. Herein, the reference value indicates the physical values corresponding to the reference direction. Specifically, the apparatus calculates how much the physical values, such as angle, rotation angle, and location, change from the reference value according to the movement or the motion measured in step 1101. For example, the apparatus can calculate the deviation value based on Equation (2) or Equation (3).

In step 1105, the apparatus calculates the beam control parameter for correcting the beam misalignment. In other words, the apparatus converts the difference value calculated in step 1103 to the value for controlling beamforming. In doing so, the detailed form of the beam control parameter can vary according to the beamforming scheme. For example, the beam control parameter can be at least one of the beamforming matrix including complex numbers used at a digital stage and the beamforming vector. The beam control parameter can be the precoding codebook index value of the transmitter or the postcoding codebook index value of the receiver, by mapping the beamforming matrix or vector to an index value. For example, when the analog beamforming is conducted, the beam control parameter can be phase and magnitude values per antenna. As for beamforming that physically moves the antenna, the beam control parameter can be a physical control values such as rotation and tilt. For example, when antennas, antenna bundles, or antenna arrays corresponding to the respective beam direction are equipped in advance and the beam index or the antenna index is allocated to each beam direction, the beam control parameter can include at least one of the beam index and the antenna index.

In step 1107, the apparatus controls the beam direction using the beam control parameter. Specifically, the apparatus applies the beam control parameter calculated in step 1105 to the beamforming. Hence, the apparatus can address the beam misalignment determined in step 1105.

Although not illustrated in FIG. 11, the apparatus can set the reference direction before measuring the motion and/or the movement in step 1101. For example, the apparatus can set the reference direction through the beam training procedure. For instance, the apparatus can set the beam direction to a plurality of candidate directions, repeatedly transmit the training reference signal, and select the candidate direction of the aligned beam direction. In addition, the apparatus can refine the beam to use a narrower beam.

Although not illustrated in FIG. 11, the apparatus can determine whether the motion or movement occurs before measuring the motion and/or movement in step 1101. Upon detecting the motion or the movement, the apparatus performs steps 1101 to 1107.

Figure 12:
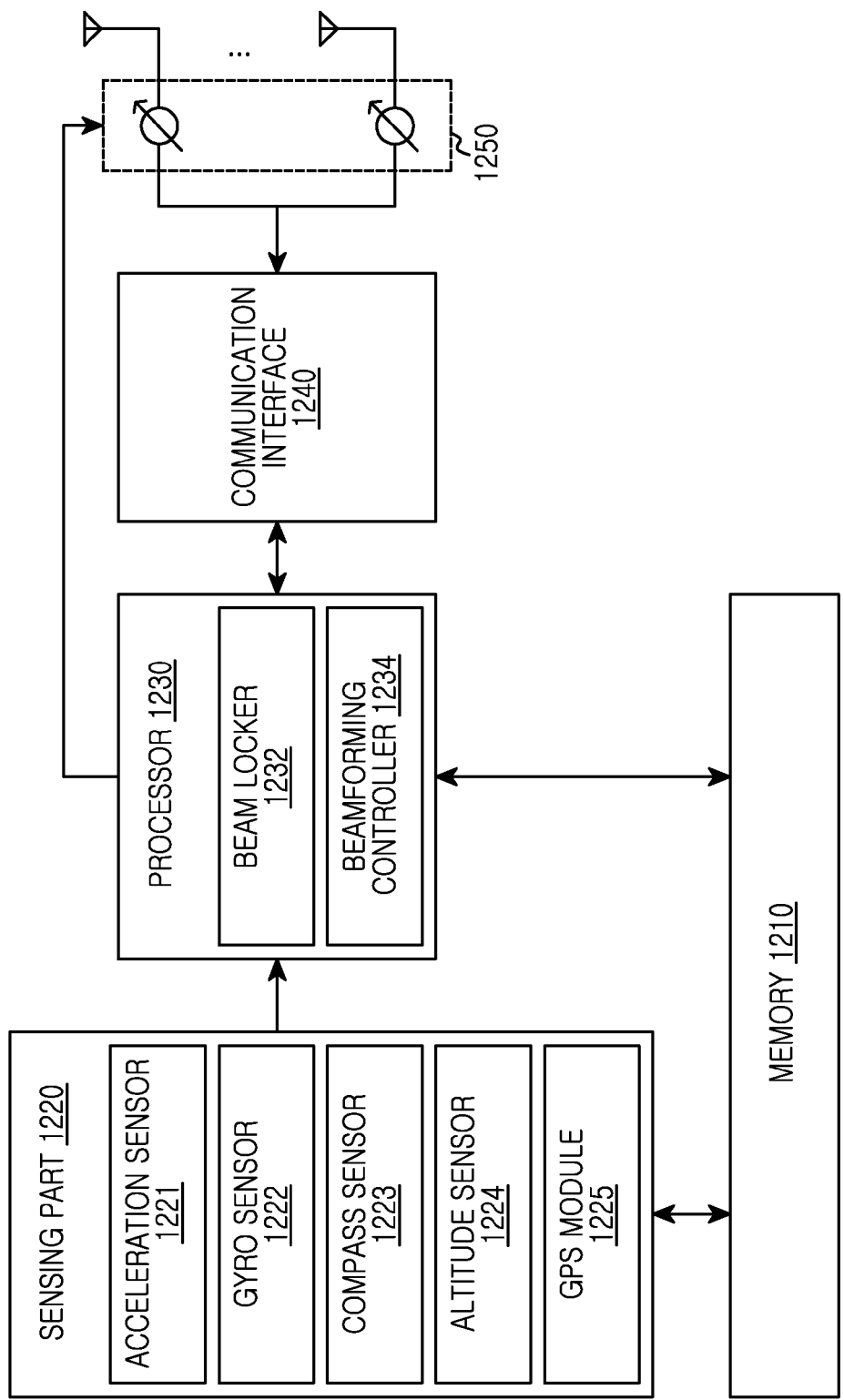
FIG. 12 is a diagram illustrating an apparatus for the beam locking in the wireless communication system, according to an embodiment of the present invention.

FIG. 12 a block diagram illustrating an apparatus for the beam locking method in the wireless communication system, according to an embodiment of the present invention.

As shown in FIG. 12, the apparatus includes a memory 1210, a sensing part 1220, a processor 1230, a communication interface 1240, and a beamformer 1250.

The memory 1210 stores a program, microcodes, setup information, system information, and traffic data for operation of the apparatus. In particular, the memory 1210 stores values for beam locking. Specifically, the memory 1210 may store physical values relating to reference direction, i.e., at least one of a direction of the tilt, an angle of the tilt, a direction, a direction of a rotation, a location coordinate and an altitude. Further, the memory 1210 may store physical values measured by the sensing unit 1220, i.e., at least one of the direction of the motion or the movement, the distance of the motion or the movement, the velocity of the motion or the movement, the acceleration of the motion or the movement, the direction of the tilt, the angle of the tilt, the angular velocity of the tilt, the angular acceleration of the tilt, the direction of the rotation, the angle of the rotation, the angular velocity of the rotation and the angular acceleration of the rotation in a three-dimensional space, the current direction, the change of the direction, the location coordinates and the change of the location coordinates in the horizontal direction based on north, and the altitude and the change of the altitude. Further, the memory 1210 may store a function and a look-up table for calculating a new beam parameter based on the movement and/or motion of the apparatus for beam locking.

The sensing unit 1220 includes at least one motion recognition sensor. The sensing unit 1220 measures the physical values indicating the movement and/or motion of the apparatus using the at least one motion recognition sensor, and provides the measurement result to the processor 1230. The sensing unit 1220 can include at least one of an acceleration sensor 1221, a gyro sensor 1222, a compass sensor 1223, an altitude sensor 1224, and a GPS module 1225. While the sensing unit 1220 includes all of the acceleration sensor 1221, the gyro sensor 1222, the compass sensor 1223, the altitude sensor 1224, and the GPS module 1225 in FIG. 12, at least one sensor can be excluded in various embodiments of the present invention. The physical values can include at least one of the absolute angle value, the rotation angle value, the location value according to the tilt, the rotation, or the movement in the three-dimensional space (i.e., the x axis, the y axis, and the z axis), and the time variation of these values.

The processor 1230 controls operations of the apparatus. In detail, the processor 1230 controls read/write operation of the memory 1210, processes the measurement result output from the sensing unit 1220, provides transmit data to the communication interface 1240, processes receive data fed from the communication interface 1240, and controls the beamforming of the beamformer 1250. Particularly, in embodiments of the present invention, the processor 1230 carries out the beam locking scheme. For the beam locking, the processor 1230 includes a beam locker 1232 and a beamforming controller 1234.

The beam locker 1232 sets the reference direction of the beam and locks the beam to retain the reference direction of the beam. More specifically, the beam locker 1232 determines the information when the beam direction is aligned; that is, the reference value. The beam locker 1232 can obtain the absolute location or direction value from the sensing part 1220 to determine the reference value, or set the reference value to '0'. The beam locker 1232 recognizes the movement, the motion, the tilt, and the rotation of the apparatus using the measurement result output from the sensing part 1220, and calculates the difference value against the reference value. Herein, the reference value indicates the physical value corresponding to the reference direction of the beam. For example, the beam locker 1232 can calculate the deviation value based on Equation (2) above. The beam locker 1232 calculates a new beam control parameter for aligning the beam direction with the reference direction using the difference value, and provides the beam control parameter to the beamforming controller 1234. For example, the beam control parameter can be calculated based on Equation (4) above. As described above, the beam locker 1232 can calculate the difference value periodically at regular time intervals, or every time the motion or the movement occurs. The beam locker 1232 determines whether the beam is misaligned after calculating the difference value. Only when detecting the beam misalignment, the beam locker 1232 can determine whether to calculate the new beam control parameter. Based on the beam control parameter fed from the beam locker 1232, the beamforming controller 1234 controls the beamformer 1250.

The communication interface 1240 converts the transmit bit stream to a baseband signal and converts the baseband signal to the receive bit stream according to a physical layer standard of the system. The communication interface 1240 can process channel coding and decoding, data modulation and demodulation, precoding and postcoding for multi-antenna mapping, Analog/Digital Converter (ADC), Digital/Analog Converter (DAC), Fast Fourier Transform (FFT), Inverse FFT (IFFT), and digital beamforming. For example, in conformity with Orthogonal Frequency Division Multiplexing (OFDM) scheme, for data transmission, the communication interface 1240 generates complex symbols by encoding and modulating the transmit bit stream, maps the complex symbols to subcarriers, and generates OFDM symbols by applying IFFT operation and inserting Cyclic Prefix (CP).

The beamformer 1250 includes a plurality of components. Each component regulates the phase and the magnitude of the signal in each antenna path. In detail, the beamformer 1250 forms the beam by regulating the phase and the magnitude of the signal transmitted in each antenna path according to the phase and magnitude values of the signal per antenna provided from the processor 1230. FIG. 12 depicts one path corresponding to each antenna and one component of the beamformer 1250 per antenna in the path. Yet, it is noted that the transmission path and the reception path can be separately established for each antenna in various embodiments of the present invention. In this case, two components of the beamformer 1250 can be equipped per antenna.

Although not illustrated in FIG. 12, the apparatus can further include a beam trainer for performing the beam training with a counterpart apparatus. For example, to determine the reference direction of the beam of the apparatus, the beam trainer can set the beam direction to the plurality of the candidate directions, repeatedly transmit the training reference signal, and select the direction fed back from the counterpart apparatus as the reference direction. Conversely, to determine the reference direction of the beam of the counterpart apparatus, the beam trainer can receive a plurality of training reference signals from the counterpart apparatus and notify the counterpart apparatus of the code value of one training reference signal having the best communication quality. In addition, the beam trainer can refine the beam to use a narrower beam. The beam trainer can set the reference direction through the beam training prior to the operations of the beam locker 1232.

FIG. 12 is a block diagram of the apparatus for analog beamforming, according to an embodiment of the present invention. In embodiments of the present invention, beamforming can employ digital beamforming, beamforming for physically moving the antenna, and beamforming for selecting one of the antennas, the antenna bundles, and the antenna arrays corresponding to the predefined beam directions. In digital beamforming, the beamformer 1250 can be omitted and the processor 1240 can form the beam by multiplying the transmit signal by the codebook. In beamforming for physically moving the antenna, the components of the beamformer 1250 each can control the location and the angle of the antenna. In beamforming for selecting one of the antennas, the antenna bundles, and the antenna arrays corresponding to the predefined beam directions, the beamformer 1250 controls to transmit and receive signals to and from the antenna group selected by the processor 1240.

When the user station locks the beam as above, the base station can perform beam training less frequently, compared to the user station that does not conduct beam locking. Specifically, the base station needs to distinguish the user station conducting beam locking and the user station not conducting beam locking. To determine whether a particular user station locks the beam, the base station requires a control information exchange procedure. For example, the base station can be informed whether the user station supports the beam locking through a capability negotiation procedure for the user station.

Figure 13:
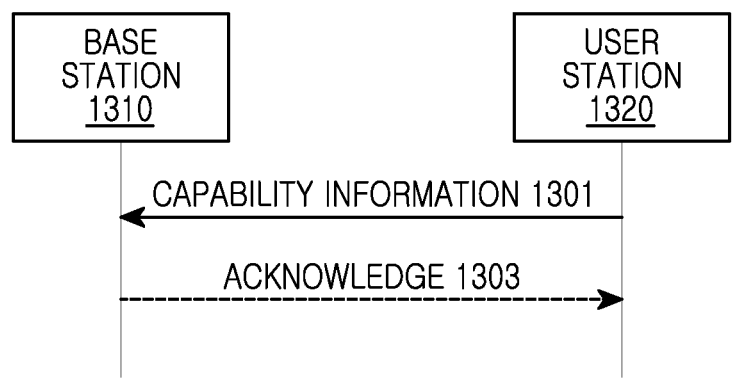
FIG. 13 is a diagram illustrating signaling between the base station and the user station in the wireless communication system, according to an embodiment of the present invention.

FIG. 13 is a diagram illustrating signaling between the base station and the user station in the wireless communication system, according to an embodiment of the present invention. Referring to FIG. 13, a user station 1320 transmits capability information including information indicating whether beam locking is supported, to a base station 1310, in step 1301. More specifically, the user station 1320 generates a control message informing of the support of the beam locking scheme, which controls to retain the beam direction in the reference direction by compensating for the change of the beam direction caused by the movement and/or motion, and transmits the control message to the base station 1310. For example, the information indicating whether beam locking is supported can be generated as shown in Table 1 below.

TABLE 1

| Syntax | Size (bits) | Description |
|---|---|---|
| Beam locking capability | 1 | 0: beam locking is supported<br>1: beam locking is not supported |

For example, the information indicating whether the beam locking is supported can further include detailed items as shown in Table 2 below.

TABLE 2

| Syntax | Size (bits) | Description |
|---|---|---|
| Processing delay for beam locking | xx | Time taken to compensate for misalignment of the beam direction when the misalignment of the beam direction occurs |
| Direction resolution | xx | A measurable resolution of an angle in tilt or rotation of the user station in a three-dimensional space |
| Velocity resolution | xx | A resolution for a velocity according to a motion of the user station |

In step 1303, the base station 1310, having received the capability information, transmits an acknowledge message notifying of reception of the capability information, to the user station 1320. For example, the acknowledge message can be generated as shown in Table 3 below.

TABLE 3

| Syntax | Size (bits) | Description |
|---|---|---|
| Beam locking capability confirm | 1 | 0: beam locking is acknowledged<br>1: beam locking is not acknowledged |

In other embodiments of the present invention, step 1303 can be omitted.

In various embodiments of the present invention, through the signaling of FIG. 13, the more detailed information about the beam locking capability than Table 1, Table 2, and Table 3 can be exchanged. For example, information indicating detailed performance of the motion recognition sensor, as shown in Table 4, can be exchanged.

TABLE 4

| Syntax | Size (bits) | Description |
|---|---|---|
| Acceleration sensor | 1 | Indicates the acceleration sensor is enable or disable |
| Gyro sensor | 1 | Indicates the gyro sensor is enable or disable |

TABLE 4-continued

| Syntax | Size (bits) | Description |
|---|---|---|
| Compass sensor | 1 | Indicates the compass sensor is enable or disable |
| Altitude sensor | 1 | Indicates the altitude sensor is enable or disable |
| GPS | 1 | Indicates the GPS is enable or disable |

Further, detailed information of the corresponding motion recognition sensor as shown in Tables 5 to 9 can also be included.

TABLE 5

| Syntax | Size (bits) | Description |
|---|---|---|
| Axis of acceleration sensor | xx | Single-axial, biaxial or triaxial |
| Direction of an axis of acceleration sensor | xx | x axis, y axis or z axis/ horizontal or vertical |
| Measurement resolution of angle | xx | A measurable resolution of angle, angular velocity and angular acceleration due to a tilt in a direction of an axis |
| Measurement resolution of acceleration | xx | A measurable resolution of acceleration, location change and velocity acceleration due to a movement in a direction of an axis. |

TABLE 6

| Syntax | Size (bits) | Description |
|---|---|---|
| Axis of gyro sensor | xx | Single-axial, biaxial or triaxial |
| Direction of an axis of gyro sensor | xx | x axis (pitch), y axis (roll) or z axis (yaw)/ horizontal or vertical |
| Measurement resolution of gyro sensor | xx | A measurable resolution of angle of the rotation, angular velocity of the rotation and angular acceleration of the rotation due to a rotation in a direction of an axis |

TABLE 7

| Syntax | Size (bits) | Description |
|---|---|---|
| Measurement resolution of compass sensor | xx | A measurable resolution of angular velocity, angular acceleration and angle based on north N in a horizontal direction |

TABLE 8

| Syntax | Size (bits) | Description |
|---|---|---|
| Measurement resolution of altitude sensor | xx | A measurable resolution of altitude based on sea-level in a vertical direction |

TABLE 9

| Syntax | Size (bits) | Description |
|---|---|---|
| Measurement resolution of GPS | xx | A measurable resolution of location value, velocity of movement and acceleration of movement in a horizontal direction and a vertical direction |

A message may include at least one of information items in Tables 1 to 9. The base station 1310 or the user station 1320 may transmit at least one control message to provide all or a part of information items in Tables 1 to 9. For example, the user station 1320 may transmit a control message including only information items regarding at least one sensor.

Further, not illustrated in FIG. 13, the base station 1310 may determine that the user station 1320 supports the beam locking scheme by signaling as stated above and may adjust a beam training time interval. In this case, the beam training time interval of the user station 1320 may be longer that a beam training time interval of a user station which does not support the beam locking scheme.

To doing so, according to an exemplary embodiment, the base station 1310 may transmit a message to notify an adjusted beam training time interval. According to another exemplary embodiment, a beam training time interval corresponding the beam locking scheme may be pre-defined. In this case, the base station 1310 and the user station 1320 may adjust the beam training time interval without a signaling.

For the signaling of FIG. 13, the base station 1310 can include a controller for generating and analyzing a message including at least one of the information of Table 1 to Table 9, and a transceiver for transmitting the message. The user station 1320 can include a controller for generating and analyzing a message including at least one of the information of Table 1 to Table 9, and a transceiver for transmitting the message.

As set forth above, the beam direction is retained in the reference direction by compensating for the change of the beam direction according to the movement and/or motion of the apparatus for the beamforming in the wireless communication system. Therefore, even when the beam direction abruptly changes, the effective beamforming can be fulfilled.

Software components including instructions or code for performing the methodologies described herein may be stored in one or more of the associated memory devices (e.g., Read Only Memory (ROM), fixed or removable memory) and, when ready to be utilized, loaded in part or in whole (e.g., into Random Access Memory (RAM)) and executed by a Central Processing Unit (CPU).

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. An apparatus for a user station in a wireless communication system, the apparatus comprising:
at least one motion recognition sensor configured to measure at least one physical value indicating at least one of a movement and a motion of the user station; and
a processor configured to
determine a direction of a beam used by the user station,
set a first direction, which is an absolute direction of the beam, as a reference direction, and
if the absolute direction of the beam is changed from the first direction to a second direction, due to movement or motion of the user station, while a relative direction of the beam is maintained, adjust the relative direction of the beam to substantially align the absolute direction of the beam with the first direction, based on a difference between a first physical value corresponding to the first direction and a second physical value corresponding to the second direction.

2. The apparatus of claim 1, wherein the at least one physical value comprises at least one of a direction of the motion or the movement, a distance of the motion or the movement, a speed of the motion or the movement, an acceleration of the motion or the movement, a direction of a tilt of the user station, an angle of the tilt, an angular speed of the tilt, an angular acceleration of the tilt, a direction of a rotation of the user station, an angle of the rotation, an angular speed of the rotation and an angular acceleration of the rotation in a three-dimensional space, a current direction of the user station, a change in a direction of the user station, location coordinates and a change in location coordinates in a horizontal direction, and an altitude of the user station and a change of the altitude.

3. The apparatus of claim 1, wherein the at least one motion recognition sensor comprises at least one of an acceleration sensor, a gyro sensor, a compass sensor, an altitude sensor and a Global Positioning System (GPS) module.

4. The apparatus of claim 1, wherein the processor determines the difference between the first physical value corresponding the first direction and the second physical value corresponding to the second direction, if at least one of the movement and the motion of the user station occurs.

5. The apparatus of claim 4, wherein, after determining the difference between the first physical value corresponding the first direction and the second physical value corresponding to the second direction, the processor determines whether the absolute direction of the beam is misaligned with the first direction.

6. The apparatus of claim 1, wherein the processor determines at least one beam control parameter based on the difference between the first physical value corresponding to the first direction and the second physical value corresponding to the second direction.

7. The apparatus of claim 6, further comprising:
a communication interface configured to adjust the relative direction of the beam by multiplying a signal stream for transmission in antenna paths by a beamforming vector or a beamforming matrix indicated by the at least one beam control parameter.

8. The apparatus of claim 6, further comprising:
a beamformer configured to adjust the relative direction of the beam by adjusting a phase and a magnitude of a signal for transmission in each antenna path according to phase and magnitude values of signals per antenna indicated by the at least one beam control parameter.

9. The apparatus of claim 6, further comprising:
a beamformer configured to adjust the relative direction of the beam by adjusting a signal radiation direction of each antenna according to a control value of each antenna indicated by the at least one beam control parameter.

10. The apparatus of claim 6, further comprising:
a beamformer configured to adjust the relative direction of the beam by activating an antenna group indicated by the at least one beam control parameter.

11. A method for performing beam locking in a wireless communication system, the method comprising the steps of:
determining a direction of a beam used by a user station;
setting a first direction, which is an absolute direction of the beam, as a reference direction; and
if the absolute direction of the beam is changed from the first direction to a second direction, due to a movement or a motion of the user station, while a relative direction of the beam is maintained, adjusting the relative direction of the beam to substantially align the absolute direction of the beam with the first direction, based on a difference between a first physical value corresponding to the first direction and a second physical value corresponding to the second direction.

12. The method of claim 11, wherein each of the first physical value and the second physical value comprises at least one of a direction of the motion or the movement, a distance of the motion or the movement, a speed of the motion or the movement, an acceleration of the motion or the movement, a direction of a tilt of the user station, an angle of the tilt, an angular speed of the tilt, an angular acceleration of the tilt, a direction of a rotation of the user station, an angle of the rotation, an angular speed of the rotation and an angular acceleration of the rotation in a three-dimensional space, a current direction of the user station, a change in a direction of the user station, location coordinates and a change in location coordinates in a horizontal direction, and an altitude of the user station and a change of the altitude due to at least one of the motion and the movement.

13. The method of claim 11, wherein the difference between the first physical value and the second physical value are estimated by at least one motion recognition sensor, and
wherein the at least one motion recognition sensor comprises at least one of an acceleration sensor, a gyro sensor, a compass sensor, an altitude sensor and a Global Positioning System (GPS) module.

14. The method of claim 11, further comprising:
determining the difference between the first physical value and the second physical value, if at least one of the movement and the motion of the user station occurs.

15. The method of claim 14, further comprising determining whether the absolute direction of the beam is misaligned with the first direction.

16. The method of claim 11, further comprising:
determining at least one beam control parameter based on the difference between the first physical value corresponding to the first direction and the second physical value corresponding to the second direction.

17. The method of claim 16, wherein adjusting the relative direction of the beam comprises multiplying a signal stream for transmission in antenna paths by a beamforming vector or a beamforming matrix indicated by the at least one beam control parameter.

18. The method of claim 16, wherein adjusting the relative direction of the beam comprises adjusting a phase and a magnitude of a signal for transmission in each antenna path according to phase and magnitude values of signals per antenna indicated by the at least one beam control parameter.

19. The method of claim 16, wherein adjusting the relative direction of the beam comprises adjusting a signal radiation direction of each antenna according to a control value of each antenna indicated by the at least one beam control parameter.

20. The method of claim 16, wherein adjusting the relative direction of the beam comprises activating an antenna group indicated by the at least one beam control parameter.

21. An apparatus for a user station in a wireless communication system, the apparatus comprising:
at least one motion recognition sensor configured to measure at least one physical value indicating at least one of a movement and a motion of the user station;
a transceiver configured to transmit a control message to a base station, wherein the control message comprises information about the at least one motion recognition sensor and information indicating whether the user station supports beam locking; and
a processor configured to adjust a relative direction of a beam to substantially align an absolute direction of the beam with a direction to the base station, if the movement or the motion of the user station is detected.

22. A method for operating a user station in a wireless communication system, the method comprising:
transmitting a control message to a base station, wherein the control message comprises information about at least one motion recognition sensor for estimating the first physical value and the second physical value and information indicating whether the user station supports beam locking;

detecting a movement or a motion of the user station by using the at least one motion recognition sensor; and adjusting a relative direction of a beam to substantially align an absolute direction of the beam with a direction to the base station.

23. An article of manufacture for performing beam locking in a wireless communication system, comprising a non-transitory computer readable medium containing one or more programs, which when executed implement the steps of:

determining a direction of a beam used by a user station;

setting a first direction, which is an absolute direction of the beam, as a reference direction; and if the direction of the beam is changed from the first direction to a second direction, due to a movement or a motion of the user station, while a relative direction of the beam is maintained, adjusting the relative direction of the beam to substantially align the absolute direction of the beam with the first direction, based on a difference between a first physical value corresponding to the first direction and a second physical value corresponding to the second direction.

* * * * *